United States Patent [19]

Rahamim et al.

[11] Patent Number: 6,081,586
[45] Date of Patent: Jun. 27, 2000

[54] MODEM HAVING A PROGRAMMABLE UNIVERSAL DATA ACCESS ARRANGEMENT

[75] Inventors: Raphael Rahamim, Orange; Thomas Grey Beutler, Tustin; Nuno F. Paulino, Newport; Alberto Mantovani, Laguna Niguel, all of Calif.; Jacques Mathe, Penvenan, France

[73] Assignee: Conexant Systems, Inc., Newport Beach, Calif.

[21] Appl. No.: 09/193,113

[22] Filed: Nov. 16, 1998
(Under 37 CFR 1.47)

[51] Int. Cl.⁷ .................................................... H04M 11/00
[52] U.S. Cl. ...................... 379/93.29; 379/93.05
[58] Field of Search ............................ 379/93.05–93.08, 379/93.26–93.29, 93.34–93.37, 395, 405, 379, 376, 412, 406, 413, 345, 377, 399, 387, 398, 375, 28–31; 375/222

[56] References Cited

U.S. PATENT DOCUMENTS

| | | |
|---|---|---|
| 4,192,978 | 3/1980 | Vincent . |
| 4,417,099 | 11/1983 | Pierce . |
| 4,450,854 | 5/1984 | Beirne . |
| 4,529,845 | 7/1985 | Boeckmann . |
| 4,644,526 | 2/1987 | Wu . |
| 4,723,267 | 2/1988 | Jones et al. . |
| 4,741,031 | 4/1988 | Grandstaff . |
| 4,757,528 | 7/1988 | Falater et al. . |
| 4,864,605 | 9/1989 | Ramsay et al. . |
| 4,993,063 | 2/1991 | Kiko . |
| 4,995,111 | 2/1991 | Tojo et al. . |
| 5,097,503 | 3/1992 | Cotty . |
| 5,136,630 | 8/1992 | Breneman et al. . |
| 5,204,896 | 4/1993 | Oliver . |
| 5,235,634 | 8/1993 | Oliver . |
| 5,245,654 | 9/1993 | Wilkison et al. . |
| 5,315,651 | 5/1994 | Rahamin et al. . |
| 5,329,585 | 7/1994 | Susak et al. . |
| 5,369,666 | 11/1994 | Folwell et al. . |
| 5,369,687 | 11/1994 | Farkas ................................. 379/93.36 |
| 5,410,594 | 4/1995 | Maruyama . |
| 5,500,895 | 3/1996 | Yurgelites . |
| 5,506,868 | 4/1996 | Cox et al. . |
| 5,555,293 | 9/1996 | Krause . |
| 5,654,984 | 8/1997 | Hershbarger et al. . |
| 5,655,010 | 8/1997 | Bingel . |
| 5,737,397 | 4/1998 | Skinner et al. . |

OTHER PUBLICATIONS

Silcon Laboratories, *Direct Digital Access Arrangement (DDAA)*, Si3032, pp. 1–28, Preliminary Rev. 0.9, Feb. 1998.
Siemens, *User's Manual—ICs for Communication*, PSB 4595 Version 2.0 and PSB 4596 Version 2.1, pp. 1–100, Apr. 1997.

*Primary Examiner*—Wing F. Chan
*Attorney, Agent, or Firm*—Akin,Gump,Strauss,Hauer & Feld, L.L.P.

[57] ABSTRACT

A modem utilizing a DAA having line side circuitry including a telephone network interface and system side circuitry including a host system interface, the line side circuitry and the system side circuitry being separated by a high voltage isolation barrier. A CODEC is provided in the line side circuitry, such that encoded information generated by the CODEC, as well as information for decoding by the CODEC, are communicated across the high voltage isolation barrier. These communications are accomplished in a digital manner. In an alternate embodiment of the invention, the line side circuitry of the modem further includes programmable detection and measurement circuitry that is programmable to measure electrical characteristics (e.g., tip/ring voltage and loop current) of the telephone line interface connection and is capable of corresponding adjustments to enable compliance with applicable regulations. The system is software programmable via control signals sent across the high voltage isolation barrier to establish electrical parameters corresponding to a specific country where the equipment may be used.

20 Claims, 10 Drawing Sheets

MODEM HAVING A PROGRAMMABLE UNIVERSAL DATA ACCESS ARRANGEMENT

SPECIFICATION

Incorporation By Reference

The following commonly-assigned patent applications are hereby incorporated by reference in their entirety, including drawings and appendices, and are hereby made part of this application for all purposes:

1) U.S. patent application Ser. No. 09/161,209, filed Sep. 25, 1998;
2) U.S. patent application Ser. No. 09/088,629, filed Jun. 2, 1998;
3) U.S. patent application Ser. No. 09/074,896, filed May 8, 1998;
4) U.S. patent application Ser. No. 09/075,451, filed May 8, 1998; and
5) U.S. patent application Ser. No. 09/929,960, filed Sep. 15, 1997.

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present invention relates generally to modems; and, more particularly, it relates to a data access arrangement having a coder/decoder located on the line side of a high voltage isolation barrier.

2. Related Art

Regulatory agencies throughout the world have established standards and regulations for connecting subscriber equipment to telephone networks. These regulations are intended to prevent damage to the telephone network and mitigate interference with other equipment also connected to the network. The regulations, however, often present difficult design challenges.

For example, subscriber equipment or data communications equipment (DCE), such as a data modem, is generally required to provide for some form of electrical isolation to prevent voltage surges or transients originating from the subscriber equipment from having a deleterious effect on the telephone network. Electrical isolation also addresses potential problems associated with differences in operating voltages between a telephone line and the subscriber equipment. More particularly, telephone line voltages may vary widely across a given network, and often exceed the operating voltage of subscriber equipment. In the United States, 1,500 volt isolation is currently required. In other countries, the prescribed isolation may reach 3,000–4,000 volts.

A number of techniques have been utilized to provide the requisite level of electrical isolation. For example, isolation transformers are often employed to magnetically couple signals between a two-wire telephone line and the analog front end of a modem or other circuit while maintaining an appropriate level of electrical isolation. The isolation transformer functions to block potentially harmful DC components, thereby protecting both sides of the data connection.

The isolation transformer is typically part of what is referred to in the modem arts as a data access arrangement (DAA). The term DAA generally refers to circuitry, which provides an interface between a public telephone network originating in a central office (CO) and a digital data bus of a host system or data terminal equipment (DTE). The DAA electrically isolates a modem or similar device from a phone line to control emissions of electromagnetic interference/radio frequency interference (EMI/RFI). In addition to electrical isolation, the DAA often develops a number of signals (e.g., a ring signal) for provision to subscriber equipment. The DAA may receive signals from the phone line through a telephone jack, such as a RJ11C connection as used for standard telephones.

Typically, a number of circuits must derive information from the telephone line, and isolation is often required for each signal communicated to and from the host system. Such circuits may include: transmit and receive circuitry; ring signal detection circuitry; circuitry for switching between voice and data transmissions; circuits for dialing telephone numbers; line current detection circuitry; circuitry for indicating that the equipment is coupled to a functional telephone line; and line disconnection detection circuitry. Conventional DAA designs utilize separate line side circuits and separate signal paths across a high voltage isolation barrier for each function of the DAA.

Modems function to convert analog signals from the telephone network to a digital format that can be used by the host system. Most countries have specific regulatory requirements governing off-hook voltage and loop current, ring detect threshold levels, and line interface impedances that must be taken into account by devices such as modems. Such electrical characteristics of a DAA are often difficult to control, due in part to the fact that the circuits which determine these characteristics are located on the line side of the high voltage isolation barrier.

Further, it is difficult to configure a DAA to satisfy the regulatory requirements of more than one country. Conventional non-programmable DAA designs are only suitable for a single country a group of countries with similar requirements.

While the isolation transformer of a DAA protects the electronic components of a modem, it often introduces distortion and consumes a relatively large amount of space. In today's world of ever-shrinking electronics, the bulk of the isolation transformer may govern the physical dimensions of the modem itself and impose other unwanted constraints on cost sensitive modem circuitry.

One method for reducing the size of the isolation transformer in a DAA involves coupling certain telephone line signals (e.g., incoming ringing signals) to modem circuitry while utilizing a separate signal path to couple data signals via a capacitively coupled isolation transformer. Although enabling the use of smaller and lighter isolation transformers, this configuration may result in excessive distortion.

Some modem configurations have eliminated the isolation transformer altogether via the use of analog electo-optical isolators. These devices employ an emitter, such as a light emitting diode, and a corresponding photo-detector circuit. This type of isolation, however, may suffer from distortion, cost and complexity issues.

Still other configurations have used an isolation transformer in the main signal path and optical isolators or relays in the ring detection and off-hook driving circuitry. Capacitors have also been utilized to differentially couple analog transmit and receive channels across an isolation barrier. Thermal and resistive isolation techniques have also been employed, but are typically complex and expensive to manufacture.

The requirement of passing analog audio signals across the high voltage isolation barrier for provision to a coder/decoder (CODEC) and other DAA circuitry hampers efforts to decrease the size and cost of the barrier due to the foregoing design constraints. Further, each signal path across the barrier adds to size and expense of the high voltage isolation barrier.

SUMMARY OF THE INVENTION

Briefly, a modem according to the present invention utilizes a DAA having line side circuitry including a telephone network interface and system side circuitry including a host system interface, the line side circuitry and the system side circuitry being separated by a high voltage isolation barrier. A CODEC is provided in the line side circuitry, such that encoded information generated by the CODEC, as well as information for decoding by the CODEC, is communicated across the high voltage isolation barrier. By placing the CODEC on the line side of the DAA, these communications may be accomplished in a digital manner, thereby permitting a reduction in the size and expense of the high voltage isolation barrier.

In an alternate embodiment of the invention, the line side circuitry of the modem further includes programmable detection and measurement circuitry that is programmable to measure electrical characteristics (e.g., tip/ring voltage and loop current) of the telephone line interface connection and is capable of corresponding adjustments to enable compliance with applicable regulations. The system is software programmable via control signals sent across the high voltage isolation barrier to establish electrical parameters corresponding to a specific country where the equipment may be used. Thus, a widely applicable and low cost DAA hardware design is provided.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

Figure 1:
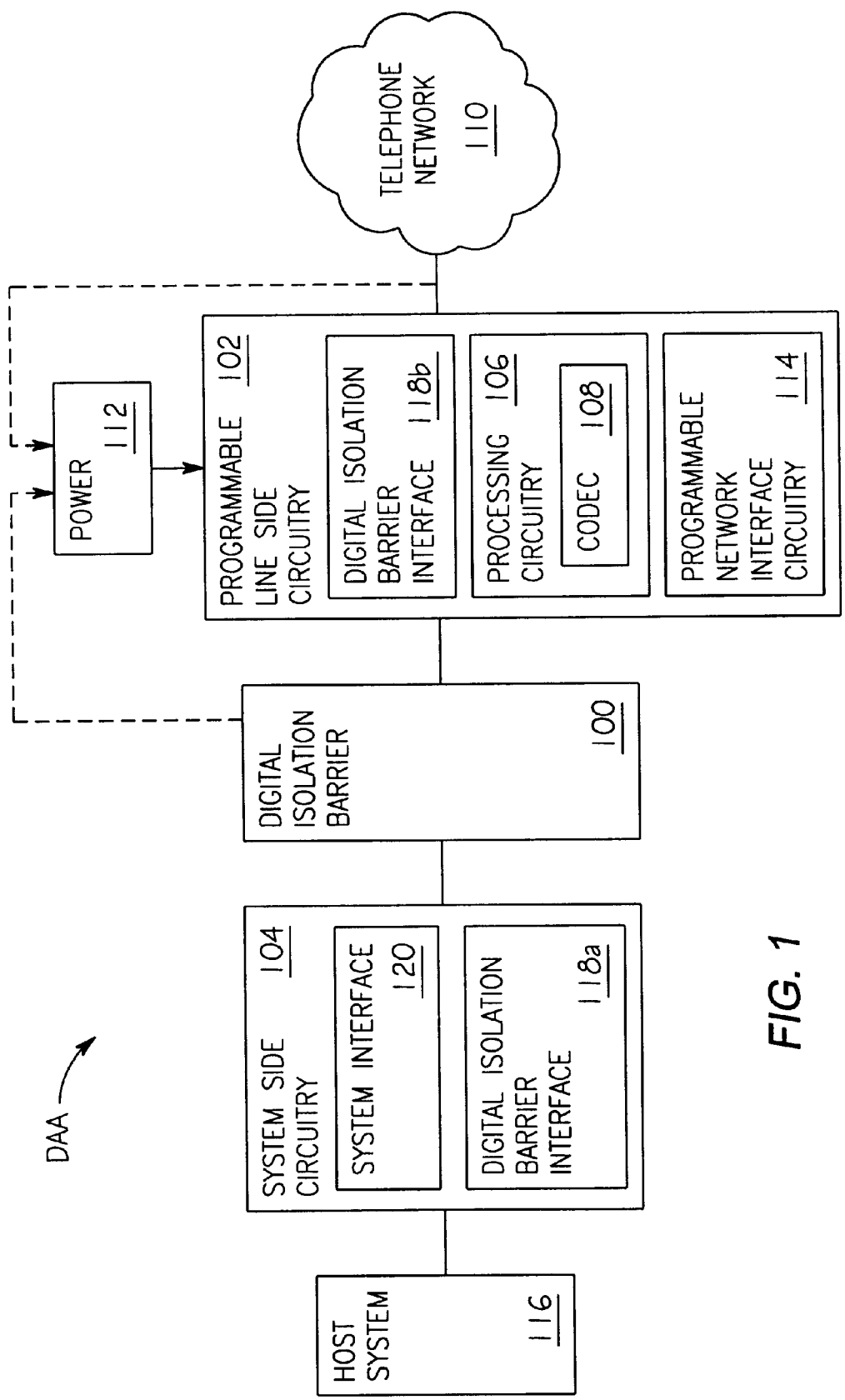
FIG. 1 is a drawing of an exemplary data access arrangement implemented in accordance with the present invention.

FIG. 1 is a schematic block diagram illustrating an exemplary DAA in accordance with the present invention. The DAA of the disclosed embodiment of the invention includes a digital isolation barrier 100 for communicatively coupling programmable line side circuitry 102 to system side circuitry 104. The digital isolation barrier 100, in conjunction with programmable features of the line side circuitry 102 which interface with a telephone network 110, provide the necessary level of electrical isolation between the line side circuitry 102 and the corresponding system side circuitry 104. The digital isolation barrier 100 is designed to be configurable to comply with both U.S. and International requirements for isolation.

The system side circuitry 104 includes a system interface 120 and a digital isolation barrier interface 118a. The system interface 120 coordinates communications with the host system circuitry 116, while the digital isolation barrier interface 118a establishes communications with the digital isolation barrier 100. Data, control and programming signals are all communicated across the digital isolation barrier 100. The bidirectional communication from the system side circuitry 104 and the line side circuitry 102 is accomplished via a digital protocol, examples of which are described below in conjunction with FIGS. 7–9 and Appendix A, which is hereby incorporated by reference and made part of this specification as if set forth in its entirety.

The programmable line side circuitry 102 includes a digital isolation barrier interface 118b corresponding to the digital isolation barrier interface 118a of the system side circuitry 104. The programmable line side circuitry 102 also includes processing circuitry 106 and programmable network interface circuitry 114. Many functions are performed by the programmable network interface circuitry 114, including measuring and establishing electrical parameters that are reflective of the condition of the lines of the telephone network 110.

The processing circuitry 106 of FIG. 1 includes a coder/decoder (CODEC) 108. The CODEC 108 functions to encode the analog signal on the lines of the telephone network 110 into a digital format, and also provides decoded digital signals for analog transmission over the telephone network 110. In a conventional DAA, a CODEC is disposed on the system side of a high voltage isolation barrier. In accordance with the present invention, however, the CODEC 108 is advantageously included on the line side of a digital isolation barrier 100 to facilitate communications with the line side circuitry 102. In addition, placement of the CODEC 108 and other circuitry/functions on the line side reduces the number of signals communicated across the digital isolation barrier 100 and facilitates programmability of the network interface circuitry 114.

Programmability of the network interface circuitry 114 may be achieved in a variety ways. For example, if the host system circuitry 116 desires to program a particular feature of the line side circuitry 102 (e.g., vary line/ring impedance), a command or programming signal is communicated to the system side 104. The command or programming signal may then be reconfigured for transmission to the line side circuitry 102 in a digital manner via the digital isolation barrier 100. Alternatively, the command or programming signal may originate in the system side circuitry 104, or be directed towards the system side circuitry 104 by the line side circuitry 102. Command or programming signals may be multiplexed and serialized for transmission across the digital isolation barrier 100, thereby reducing the complexity and expense of the digital isolation barrier. Data signals may also be combined with the command or programming signals, further simplifying the digital isolation barrier 100.

The line side circuitry 102 of the disclosed embodiment of the invention operates with a "floating" ground reference, and can tolerate high voltage inputs for compatibility with the telephone network 110 and typical surge requirements. The system side circuitry 104 of the disclosed embodiment operates with a fixed digital ground and utilizes standard CMOS logic levels. The system side circuitry 104 shares a common ground and power supply with the host system circuitry 116. The programmable line side circuitry 102 of the disclosed embodiment receives power from either the digital isolation barrier 100 or the telephone network 110 via a power connection 112.

A DAA in accordance with the invention can be utilized with any product that interfaces a telephone network 110 connection to any digital signal processor technology, or any processor of host system circuitry 116 that performs analog modem modulations. Examples include, but are not limited to, data modems, computers, web browsers, set top boxes, fax machines, cordless telephones and telephone answering machines. In addition, many different interfaces with the telephone network 110 and/or other transmission media are contemplated, such that the DAA may be configured to be compatible with whichever means is utilized.

Figure 2:
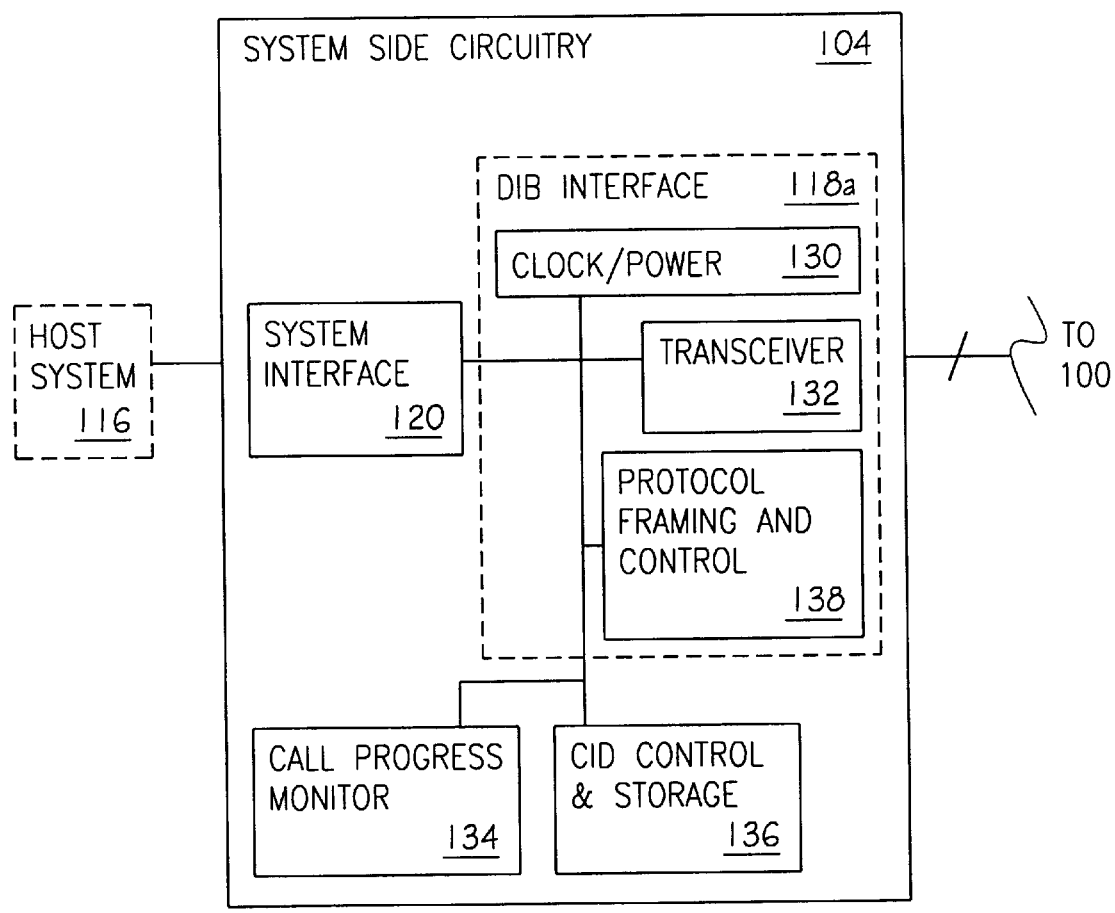
FIG. 2 is a drawing illustrating an exemplary embodiment of the system side circuitry of the data access arrangement of FIG. 1.

FIG. 2 is a drawing illustrating an exemplary embodiment of the system side circuitry of the data access arrangement of FIG. 1. The digital isolation barrier interface 118a of the disclosed embodiment includes clock/power driver circuitry 130, as well as protocol framing and control circuitry 138 and a transceiver 132, which coordinate bidirectional transfer of data, control and programming signals across the digital isolation barrier 100.

The clock and power driver circuitry 130 is responsible for transferring power and clock signals across the digital isolation barrier 100 to the line side circuitry 102 via the digital isolation barrier 100. The clock and power driver circuitry 130 is programmable by the system side circuitry 102 to include a number of power states, including: an off-hook, high power mode in which line side circuitry 102 is powered by the system side circuitry 104; an off-hook, low power mode in which the line side circuitry 102 is powered by the telephone network 110 and/or the system side circuitry 104; and on-hook, low power mode in which the line side circuitry 102 is waiting for a ring or a caller ID signal; and an on-hook, disabled state in which the line side circuitry 102 is not receiving power. The clock and power driver circuitry provides several different drive current levels as needed for different operating/power consumption modes of the line side circuitry 102. As noted, certain embodiments or power modes of the line side circuitry 102 may not require power from the clock and power driver circuitry 130.

The digital isolation barrier interface 118a also includes a protocol framing and control circuit 138, which functions to organize the data transmitted by the transceiver 132. The protocol framing control circuit 138 also deconstructs signals received by the transceiver 132 from the line side circuitry 102.

Inputs to the system interface circuit 120 include inputs for off-hook signal(s), caller ID number information, international control signals, and reserved signals for upgrades. Outputs of the system interface circuit 120 include but are not limited to a line side off-hook signal, an extension off-hook signal, a remote unhook signal, a digital PBX signal, a ring indication signal, and a wake signal. General-purpose I/O inputs are also provided.

Numerous alternative implementations for the communication lines between the host system circuitry and the system interface circuit 120 are contemplated. For example, the system interface circuit 120 may be configured to interface directly with a controllerless host architecture. A high-speed serial data interface or a parallel data interface with various I/O lines for modem control and DAA status may also be used. Likewise, the call progress monitor 134 and the CID control and storage circuitry 136 may be included in the host system circuitry 116 or in the line side circuitry 102, and the transceiver circuitry 132 and 186 may provide for serial communications, parallel communications, or a combination thereof.

The system side circuitry 104 also includes a call progress monitor 134 and a caller ID (CID) control and storage circuit 136. The call progress monitor 134 is configured to analyze raw signal samples from the CODEC 108 and drive a buzzer or speaker (not shown). The call progress monitor 134 of the disclosed embodiment is also programmable to provide a variety of audio levels.

The CID control and storage circuit 136 is preferably configurable to support all known worldwide caller ID schemes. This includes, but is not limited to, the United States and North America, Japan, Western Europe (including the United Kingdom) and France. Accordingly, the CID control and storage circuit 136 supports both caller ID information occurring between rings (United States) and after a tip/ring reversal (United Kingdom, Japan). The CID control and storage circuit 136 also provides memory (not separately illustrated) for storing a digital representation of caller ID information received from the digital interface barrier 100. Caller ID data is decoded before storage in the memory, although storage of raw information is acceptable. The CID control and storage circuitry 136 of the disclosed embodiment is programmable to be disabled by the host system circuitry 116 or other portions of the DAA.

Figure 3A:
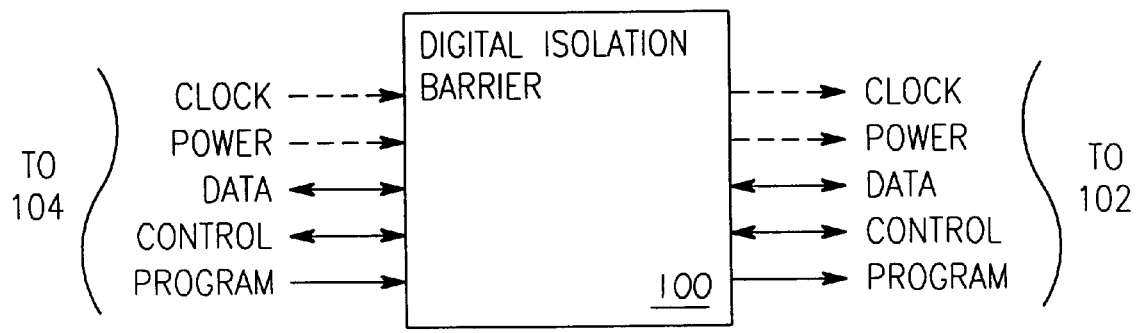
FIGS. 3A–3E are drawings providing alternate embodiments of a digital isolation barrier according to the present invention.

FIGS. 3A–3E depict exemplary alternate embodiments of a digital isolation barrier 100 implemented in accordance with the present invention. Referring first to FIG. 3A, a number of signals may be communicated between the line side circuitry 102 and the system side circuitry 104. As noted above, a clock signal may be passed from the system side circuitry 104 to the line side circuitry 102 in order to facilitate synchronization of serial communications. In addition, the line side circuitry 102 may be powered completely or in part by a power signal communicated across the digital isolation barrier 100. Further, serial data, control and/or program signals are also communicated across the digital isolation barrier 100. As discussed immediately below, a variety of electrical configurations for transferring these signals across the digital isolation barrier are possible.

Figure 3B:
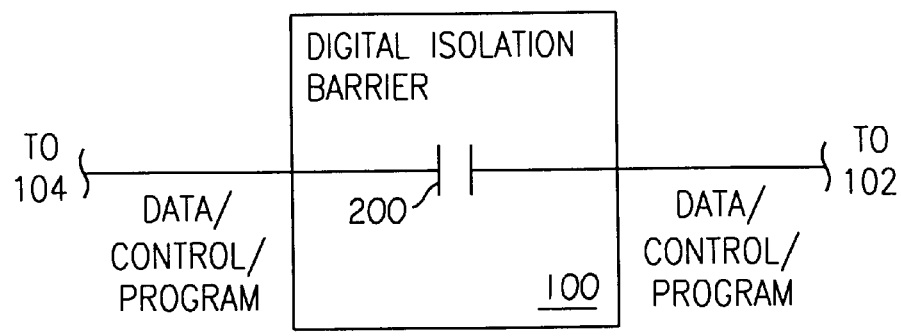

FIG. 3B depicts an embodiment of the digital isolation barrier 100 in which the serial datastream is communicated across a signal path employing a single capacitor 200. In this embodiment, the transceiver circuitry 132 and 186 of the system side circuitry 104 and the line side circuitry 102, respectively, are configured to communicate a single-ended pulse train across the capacitor 200.

Figure 3C:
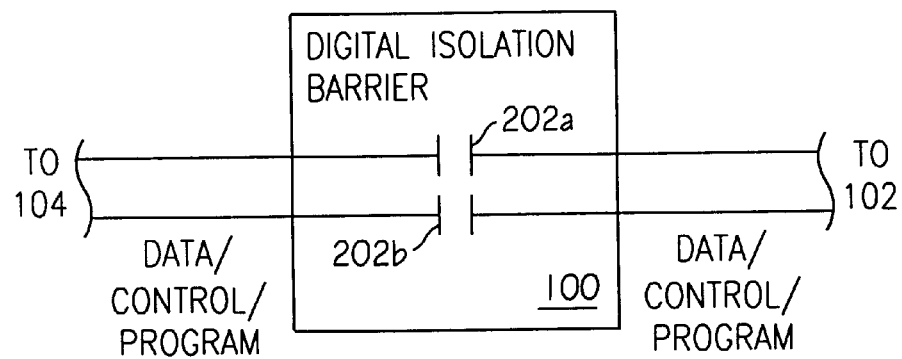

FIG. 3C depicts an embodiment of the digital isolation barrier 100 in which the single capacitor configuration is replaced by a differential configuration involving capacitors 202a and 202b. In this embodiment, the serial datastream consisting of data, control and/or programming signals is organized in the same manner as if the interface of FIG. 3B were utilized. However, the transceiver circuitry 132 and 186 is configured for differential communications when utilized with the digital isolation barrier of FIG. 3C. One example of such a configuration is discussed below in conjunction with FIG. 5.

Figure 3D:
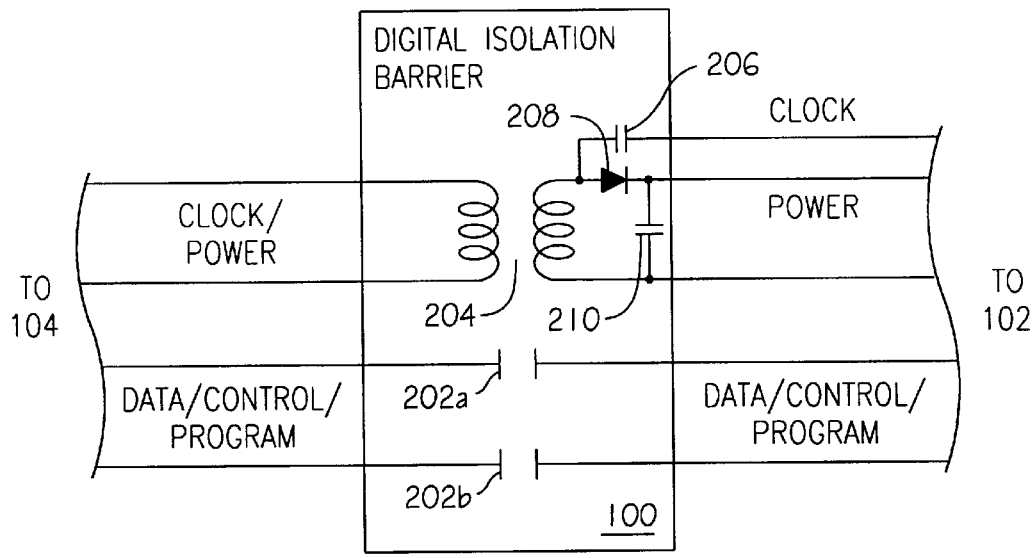

FIG. 3D illustrates another contemplated embodiment for the digital isolation barrier 100. In this embodiment, a transformer 204 is added to the circuitry of FIG. 3C to communicate clock and power signals from the system side circuitry 104 to the line side circuitry 102. More specifically, the primary side of the transformer 204 is driven by the system side circuitry 104 such that clock and power signals of sufficient strength can be derived from the secondary side of the transformer 204. The clock signal, if provided, is coupled to the line side circuitry 102 via a relatively small value capacitor 206. The power connections of the line side circuitry 102 are coupled to the secondary side of the transformer 204 via a half wave rectifier comprising a voltage regulating diode 208 and a charge storage capacitor 210. The capacitor 210 is provided across the power and ground connections of the line side circuitry 102 to provide a stable power supply voltage.

Although the disclosed embodiment of FIG. 3D employs a half wave rectifier, a full wave rectifier or a bridge rectifier could also be utilized. In another contemplated embodiment, clock and power signals are communicated across the digital interface barrier 100 via a separate pair of capacitors (not shown).

Figure 3E:
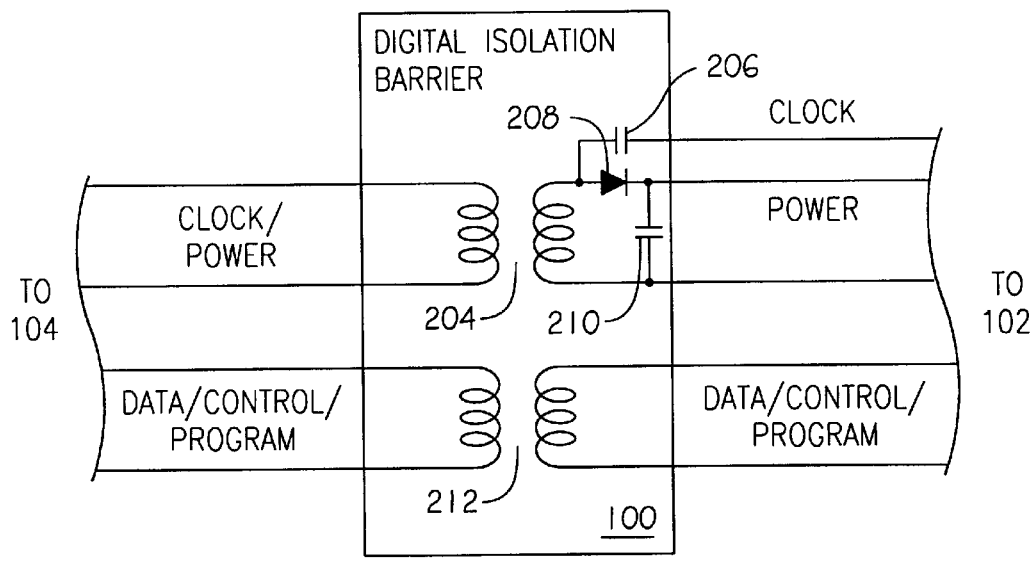

FIG. 3E illutrates another alternate embodiment of the digital isolation barrier 100. In this embodiment, an isolation transformer 212 replaces the isolation capacitors 202a and 202b. Data, control and programming signals are communicated between the system side circuitry 104 and the line side circuitry 102 utilizing the same serial data protocol of the other embodiments. Although not separately illustrated, other types of circuitry (such as opto-couplers and thermal relay circuitry) may be used to effect a digital isolation barrier 100 in accordance with the present invention.

Figure 4A:
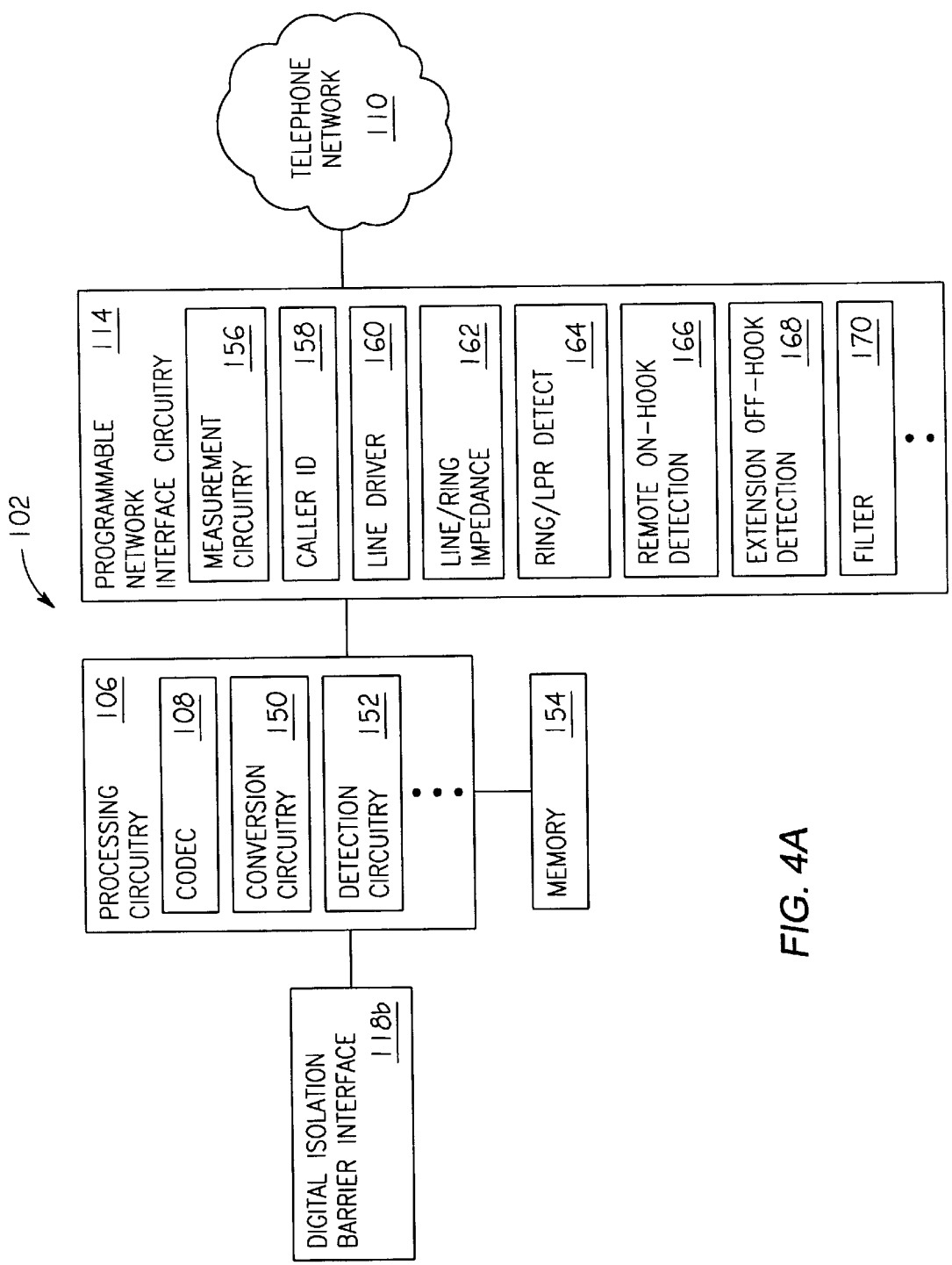
FIGS. 4A and 4B are drawings providing exemplary details of the line side circuitry of the data access arrangement of FIG. 1.

FIG. 4A is a drawing providing exemplary details of an embodiment of the line side circuitry of the data access arrangement of FIG. 1. As described above, the line side circuitry 102 is isolated from the rest of the DAA by the digital isolation barrier interface 118b and the digital isolation barrier 100 in order to comply with applicable regulatory requirements.

The line side circuitry 102 of FIG. 4A includes processing circuitry 106 and programmable network interface circuitry 114. The processing circuitry 106 of the disclosed embodiment is comprised of a CODEC 108, conversion circuitry 150 and detection circuitry 152. A memory 154 is also provided for use by the processing circuitry 106. Various components of the processing circuitry 106 may be configurable by the system side circuitry 104, or pre-programmed by code stored in the memory 154. It is further contemplated that the memory 154 may store electrical specifications and configurations relating to the regulatory requirements of various countries.

The CODEC 108 of the disclosed embodiment of the invention is a 16 bit, 16 KHz a second order sigma-delta CODEC used for sampling analog signals on the telephone network 110, and to provide such signals to the telephone network 110. The conversion circuitry 150 includes an analog-to-digital converter (ADC) and a digital-to-analog converter (DAC) for supporting various functionality of the programmable network interface circuitry 114. The detection circuitry 152 may serve a variety of functions, including monitoring of the programmable network interface circuitry 114 for significant changes in the status of the telephone network 110, as well as monitoring and execution of commands from the system side circuitry 104.

The programmable network interface circuitry 114 includes a wide variety of programmable functions. For example, programmable measurement circuitry 156 is provided with adjustable parameters for measuring tip/ring voltage and loop current conditions on the lines of the telephone network 110.

The caller ID circuit 158 receives and decodes caller identification information from the telephone network 110. To this end, it includes a relatively simple ADC and a demodulator complying with one or more standards (e.g., V.23/Bell 202, ETSI 300). It is also capable of transferring caller identification information across the digital isolation barrier 100 in a low power or D3cold state, and is programmable to provide caller ID information without a ring or line polarity reversal.

Signals are provided by the DAA to the telephone network 110 via line driver circuitry 160. The line driver circuitry 160 of the disclosed embodiment is programmable to drive signals having the electrical characteristics prescribed by the country in which the DAA is being used. Programmable line/ring impedance circuitry 162 is also provided to allow the DAA or host system circuitry 116 to program the electrical characteristics of the DAA as seen by the telephone network 110 to facilitate compliance with a variety of regulatory standards, including country-by-country ring loading. Values measured by the measurement circuitry 156 may be used in this process. In addition, the programmable line/ring impedance matching circuitry 162 of the disclosed embodiment includes support for metering filters.

The ring/line polarity reversal (LPR) detection circuitry 164 of the disclosed embodiment is likewise programmable to comply with both U.S. and international requirements. The ring/LPR detection circuitry 164 functions to provide ring and ring wake bit signals. In addition, the ring/LPR detection circuitry 164 is configurable to provide line current sensing information for use by remote on-hook detection circuitry 166, extension off-hook detection circuitry 168 and digital PBX functions.

Other contemplated components of the programmable network interface circuitry 114 include, for example: filtering circuitry 170, pulse dialing circuitry, hook switch circuitry, general purpose I/O lines, line current sensing for digital PBX detection, measurement circuitry for determining Central Office battery and loop DC resistance, line in use indicators, PABX digital line detection circuitry, and host controlled worldwide DC masks. Many of the disclosed features allow the host system circuitry 116 to easily ascertain the condition of the telephone network 110. The line side circuitry 102 further includes a hard coded key (or sequence of keys) that can be used by software executed by a microcontroller or by digital signal processing circuitry (not separately illustrated) to enable itself.

Figure 4B:
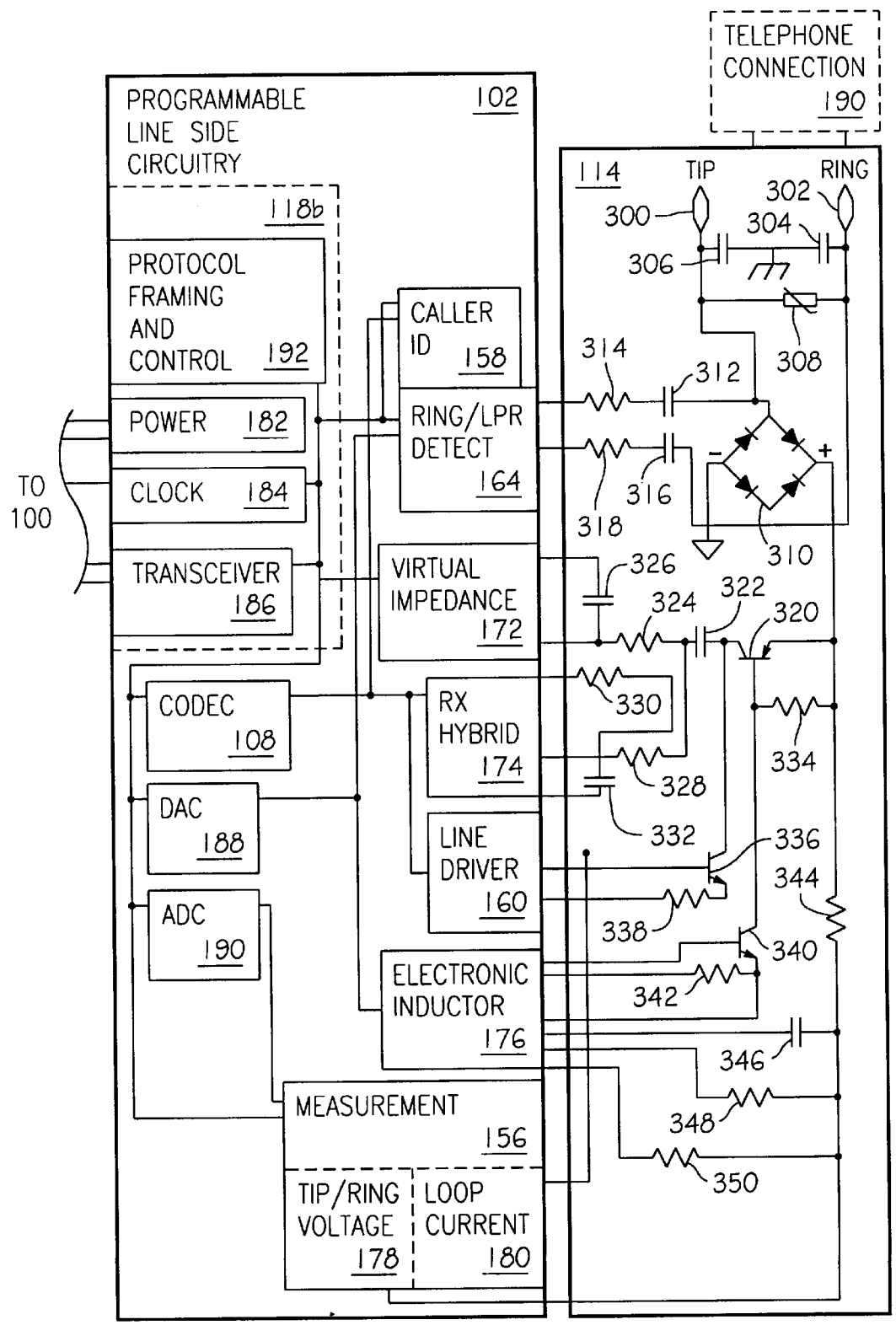

FIG. 4B is a drawing providing exemplary details of an another embodiment of the line side circuitry of the data access arrangement of FIG. 1. The digital isolation barrier interface 118b of this embodiment includes a protocol framing and control circuit 192 that functions to organize the data transmitted by the transceiver 186. The protocol framing circuit 192 also deconstructs signals received by the transceiver 186 from the system side circuitry 104. In addition, an optional power regulation circuit 182 is provided if the line side circuitry 102 receives power from the system side circuitry 104. Likewise, a clock circuit 184 is provided in the digital isolation barrier interface 118b to receive a signal from the system side circuitry 104 for use in generating clock signals for the logic of the programmable line side circuitry 102. Further details of the operation of an exemplary power regulation circuit 182 and an exemplary clock circuit 184 may be found in previously incorporated U.S. patent application Ser. No. 09/088,629, filed Jun. 2, 1998, and U.S. patent application Ser. No. 09/161,209, filed Sep. 25, 1998.

In addition to the CODEC 108, a DAC 188 and an ADC 190 are also provided. The DAC 188 and ADC 190 may operate as part of the CODEC 108, or may be separate circuits for use by other components of the line side circuitry 102. For example, the DAC 188 of the disclosed embodiment is utilized by a ring/LPR detection circuitry 164 and an electronic inductor 176. Similarly, the ADC 190 operates in conjunction with the measurement circuitry 156, which includes tip/ring voltage measurement circuit 178 and loop current measurement circuitry 180.

A hybrid circuit 174 is coupled to the CODEC 108 for performing two wire to four wire conversion functions and to provide incoming signals to the CODEC 108. A line driver circuit 160 is also coupled to the CODEC 108 and other analog circuitry of the programmable network interface 114. The line driver provides signals from the CODEC 108 to the tip 300 and ring 302 conductors of the telephone connection 190.

The analog circuitry of the programmable network interface 114 includes electromagnetic interference (EMI) suppression capacitors 306 and 304 coupled between the tip connection 300 and ring connection 302, respectively, of the telephone connection 190. In addition, a metal oxide varistor 308 is coupled between the tip connection 300 and ring connection 302 to provide lightning and surge protection. It is contemplated that the metal oxide varistor 308 could be replaced by a sidactor or similar circuit.

A full wave rectifier 310 is also coupled between the tip connection 300 and ring connection 302. As known to those skilled in the art, the full wave rectifier 310 ensures that the fsame polarity of DC signal is present at its "+" terminal regardless of the DC polarity of the tip and ring connections 300 and 302. In addition, a capacitor 312 and resistor 314 are coupled in series between the tip connection 300 and the ring/LPR detection circuitry 164. Similarly, a capacitor 316 and resistor 318 are coupled between the ring connection 302 and the ring/LPR detection circuitry 164. These connections provide differential inputs to the ring/LPR detect circuitry 164.

The emitter of a bipolar junction transistor 320 is coupled to the "+" terminal of the full wave bridge rectifier 310, while its collector is coupled to a capacitor 322 and a transistor 336. The transistor 320, in conjunction with a resistor 334 coupled between its emitter and base, functions to isolate the virtual impedance circuit 172 and the hybrid circuit 174 from the telephone connection 190 when in an on-hook condition. The virtual impedance circuit 172 is coupled to the capacitor 322 via a capacitor 326 and resistor 324, while the hybrid circuit 174 is coupled to the capacitor 322 via resistors 328 and 330 and a capacitor 332. In the disclosed embodiment, these resistors and capacitors provide signal gain/conditioning to allow the virtual impedance circuit 172 and hybrid circuit 174 to operate at a variety of tip/ring voltage levels. The transistor 320 and the resistor 334 are not required in certain contemplated applications.

The transistor 336 and resistor 338, which are coupled to the line driver circuit 160, allow the line side circuitry 102 to provide signals to the tip and ring connections 300 and 302 via the full wave bridge rectifier 310. More specifically, modulation of the base-collector voltage of the transistor 336 allows an AC signal to be presented on the tip and ring connections 300 and 302. A transistor 340 having a collector coupled to the base of the transistor 320, in conjunction with the transistor 342, draw line current from the telephone connection 190 for provision to the electronic inductor 176 to indicate off-hook conditions. The electronic inductor 176 operates in conjunction with the DAC 188, ADC 190 and software control functionality of the DAA. The electronic inductor 176 is also coupled to the "+" terminal of the fall wave bridge rectifier 310 via resistors 344, 348, 350 and capacitor 346. The resistor dividers formed of resistors 344 and 348 are utilized to determine if the tip and ring connection 300 and 302 voltages reflect an on-hook condition.

The loop current measurement circuitry 180 is also coupled to the emitter of the transistor 340 in order to measure current levels present on the tip and ring conductors 300 and 302. The tip/ring voltage measurement circuit 178 is coupled to the "+" terminal of the full wave bridge rectifier 310 via the resistor 344.

The DAC 188 and ADC 190 are utilized in the disclosed embodiment to aid in measuring currents and voltages in the tip and ring connections 300 and 302, and for providing related information to the protocol framing and control circuit 192 for provision to the system side circuitry 104. The DAC 188 and ADC 190 are programmable to allow modifications to the current and voltages on the tip and ring connections 303 and 302 (e.g., the line side circuitry 102 can be programmed to draw more current from the tip and ring connections 300 and 302 to lower telephone line voltages as may be required in a specific country).

As with the embodiment of FIG. 4A, the line side circuitry 102 of FIG. 4B may include various other combinations of programmable features. In addition, further exemplary details of specific portions of the programmable line side circuitry 102 of FIGS. 4A and 4B can be found in the references incorporated above, including: U.S. patent application Ser. No. 09/074,896, filed May 8, 1998; U.S. patent application Ser. No. 09/075,451, filed May 8, 1998; and U.S. patent application Ser. No. 09/929,960, filed Sep. 15, 1997.

Figure 5:
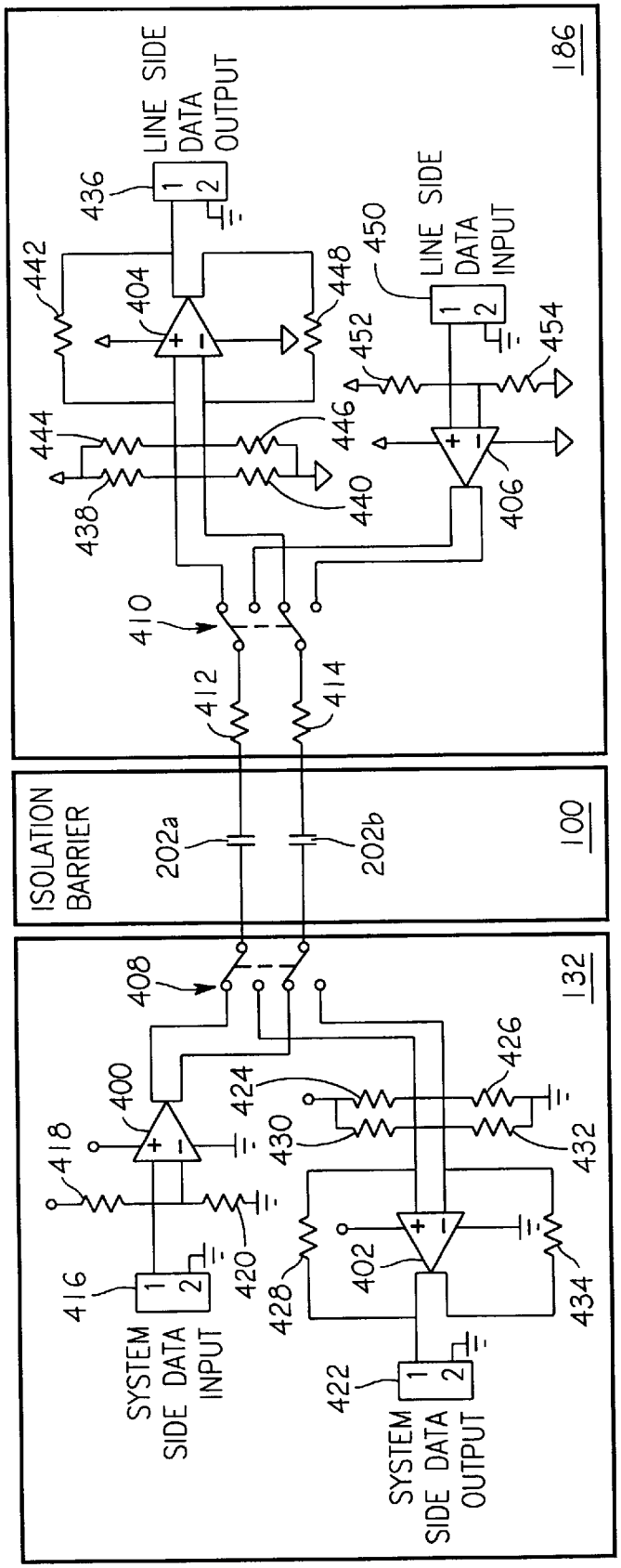
FIG. 5 is a drawing of exemplary transceiver circuitry according to the present invention for communicating a serial datastream across the digital isolation barrier of FIG. 1.

FIG. 5 is a drawing of exemplary transceiver circuitry 132 and 186 for communicating a serial datastream across the digital isolation barrier 100 of FIG. 1. The disclosed circuitry provides for bidirectional serial communications across the digital isolation barrier 100 in a differential manner. To this end, each of the transceivers 132 and 186 comprise switchable line driver circuitry.

Referring more specifically to transceiver 132, a first differential output comparator 400 is provided for driving signals across the digital isolation barrier 100, while a second comparator 402 is provided for receiving signals from the digital isolation barrier 100. An integrated double-pole double-throw switch 408 is provided to couple either the outputs of the comparator 400 or the inputs of the comparator 402 to the digital isolation barrier 100. Operation of the switch 408 is coordinated with the operation of an integrated double-pole double-throw switch 410 of the transceiver circuit 186.

Data to be transmitted by the system side circuitry 104 is provided to the non-inverting input of the comparator 400 via a connection 416. Resistors 418 and 420 are coupled in series between system side power and ground to provide a reference voltage (at the common node) to the inverting input of the comparator 400. The reference voltage is determined by the ratio of the resistors 418 and 420, and is set to one half of the power supply voltage or other suitable voltage level.

When the transceiver circuitry 132 is receiving data from the digital isolation barrier 100, the signals provided to the input of the comparator 402 of the disclosed embodiment require DC voltage reference levels for the incoming AC signals. To this end, the non-inverting input of the comparator 402 is coupled to the common node of a resistor divider formed by resistors 424 and 426. Similarly, the inverting input of the comparator 402 is coupled to the common node of a resistor divider network formed by resistors 430 and 432. A system side data output connection 422 is coupled to one output of the comparator 402. A feedback resistor 428 is coupled between this output and the non-inverting input of the op-amp 402 to provide hysterisis for purposes of noise immunity. Similarly, a feedback resistor 434 is coupled between the other output of the comparator 402 and its inverting input.

Current limiting resistors 412 and 414 are coupled between the digital isolation barrier 100 and the poles of the double-pole double-throw switch 410 of the transceiver circuit 186. Differential output comparators 404 and 406 are configured to receive and transmit signals, respectively, in the same manner as the comparators 400 and 402. More specifically, the outputs of the differential output comparator 406 are coupled to a paired side of the switch 410 in order to transmit data signals. The inverting input of the comparator 406 is provided a reference voltage by a voltage divider formed of series connected resistors 452 and 454. The non-inverting input of comparator 406 is coupled to a line side data input connection 450, and receives the input to be provided across the digital isolation barrier 100.

The comparator 404 is configured to provide data to a line side data output connection 436 when the switch 410 is configured as illustrated. Accordingly, the inputs of the comparator 404 are coupled to a paired side of the double-pole double-throw switch 410. A DC bias voltage is established at the non-inverting input of the comparator 404 by a voltage divider formed of resistors 438 and 440. Similarly, a DC bias voltage is provided to the inverting input of the comparator 404 by a resistor divider formed of resistors 444 and 446. A feedback resistor 442 is coupled between one output of the comparator 404 and its non-inverting input to provide hysterisis. Likewise, a feedback resistor 448 is coupled between the opposing output of the comparator 404 and its inverting input.

Control of the double-pole double-throw switches 408 and 410 is synchronized by protocol framing and control circuitry 138 and 192, respectively, as discussed below in conjunction with FIGS. 7–9. Many different transceiver circuit arrangements are possible for driving differential signals across the digital isolation barrier 100, and it is not intended that this embodiment of the invention be limited to any one particular arrangement.

Figure 6:
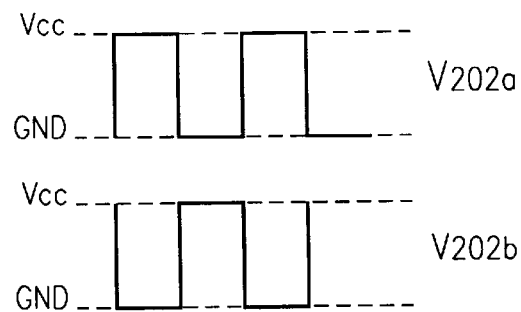
FIG. 6 is a voltage waveform drawing illustrating differential communications across the digital isolation barrier of FIG. 5.

FIG. 6 provides exemplary voltage waveforms depicting the differential voltages across the digital isolation barrier of FIG. 5. More specifically, a first $V_{202a}$ is shown for a typical voltage across the isolation capacitor 202a, while a second $V_{202b}$ is shown for the corresponding differential waveform across the isolation capacitor 202b. As illustrated, one of the voltages is at a logic high level while the corresponding voltage is at a logic low level. As will be appreciated by those skilled in the art, utilizing differential voltages across the isolation barrier 100 may improve signal integrity, although single-ended arrangements are also contemplated.

Figure 7:
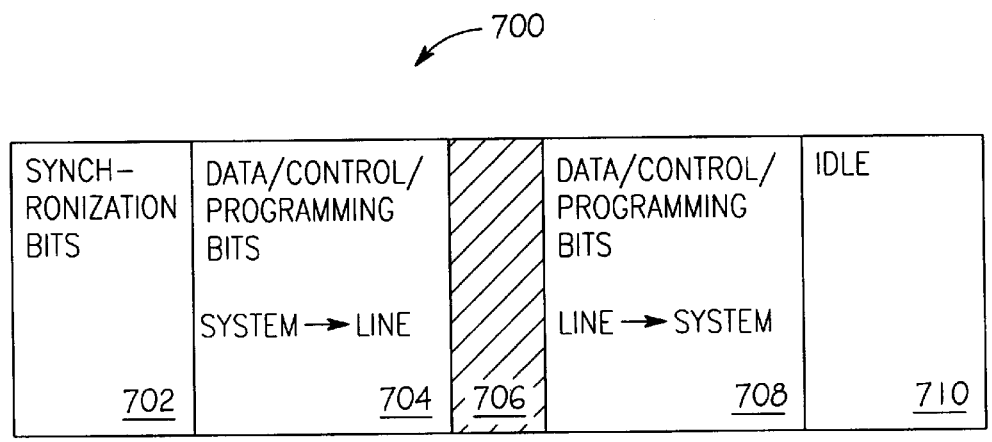
FIG. 7 is an illustration of an exemplary serial protocol according to the present invention for communicating information across the digital isolation barrier of FIG. 1.

FIG. 7 is a diagram of an exemplary serial frame protocol for communicating information across the digital isolation barrier 100 of FIG. 1 in accordance with the present invention. Because the digital isolation barrier 100 is composed of devices such as capacitors or transformers, communications are achieved via AC waveforms. Therefore, in the disclosed embodiment, it is desirable to use an encoding scheme that eliminates long sequences of zeros or ones in the data.

The serial protocol provides sufficient bandwidth to accommodate data from the CODEC 108, CODEC 108 control, data and status signals, line side circuitry 102 control inputs, line side circuitry 102 status outputs, as well as a number of general purpose input/output signals. It is also contemplated that errors (such as those due to voltage surges) may be accounted for by error correction techniques. One method of detecting such errors is to include redundancy in the transmitting data, such as providing a separate, redundant data packet for each data packet that is transmitted.

The exemplary serial frame 700 of FIG. 3 is composed of a number of components or bit groupings. Specifically, frame synchronization bits 702 are provided to coordinate communications between the system side circuitry 104 and the line side circuitry 102. In the enclosed embodiment of the invention, these frame synchronization bits 702 are provided by the system side circuitry 104, although other configurations are possible. Following the frame synchronization bits 702, data, control and/or programming bits are transmitted across the digital isolation barrier 100 to the line side circuitry 102. In the disclosed embodiment of the invention, in which bidirectional serial communications across the digital isolation barrier 100 are utilized, a number of reversal bits 706 are provided in order to allow sufficient time for the transceiver circuitry 132 and 186 to switch direction. The number of bits required depends on the switching time of the particular transceiver circuitry that is utilized by the DAA. A specific reversal synchronization pattern may be utilized to initiate reversal of the transceiver circuitry.

Next, data, control and/or programming bits are communicated in a serial manner from the line side circuitry 102 to the system side circuitry 104. Idle bits 710 are also provided in the serial frame 700 to provide extra bandwidth (in a predefined frame size) for addition of other capabilities and information.

The data, control and/or programming bits may also include interrupt-type information for use in communicating status changes and/or synchronization. For example, in the disclosed embodiment the system side circuitry 104 responds to all interrupt events received over the digital isolation barrier 100. The system side circuitry 104 uses an interrupt mask register (not illustrated) to determine if interrupt events should be relayed to the host system circuitry 116. In the disclosed embodiment, the circuits which are able to interrupt the system side circuitry 104 are the caller ID circuit 158 and the ring/LPR detection circuitry 164. Any activity from these circuits should be detected to allow the system side circuitry 104 to wake up (at least partially) and validate ring and/or caller ID data.

One contemplated encoding protocol involves transmitting data across the digital isolation barrier 100 at half of the clock rate. In this scheme, a "0" is coded as a logic level low to a logic level high transition, while a "1" is coded as a transition from a logic level high to a logic level low transition. For example, if a 4 MHz clock is provided to the line side circuitry 102, a 2 MHz signal derived from the clock signal may be used as a bit clock for serial communications. Using this arrangement, 128 bits are available in serial form during one period of a 16 kHz sample rate with a 2.048 MHz clock (128=4.096 MHz/(2*16 kHz)). It is contemplated that control data may flow at either a lower or higher rate than data from the CODEC 108.

A specific embodiment of a protocol for digital serial communications across the digital interface barrier 100 is provided in attached Appendix A. The protocol disclosed therein is exemplary in nature, and those skilled in the art will recognize that numerous variations are possible.

Figure 8:
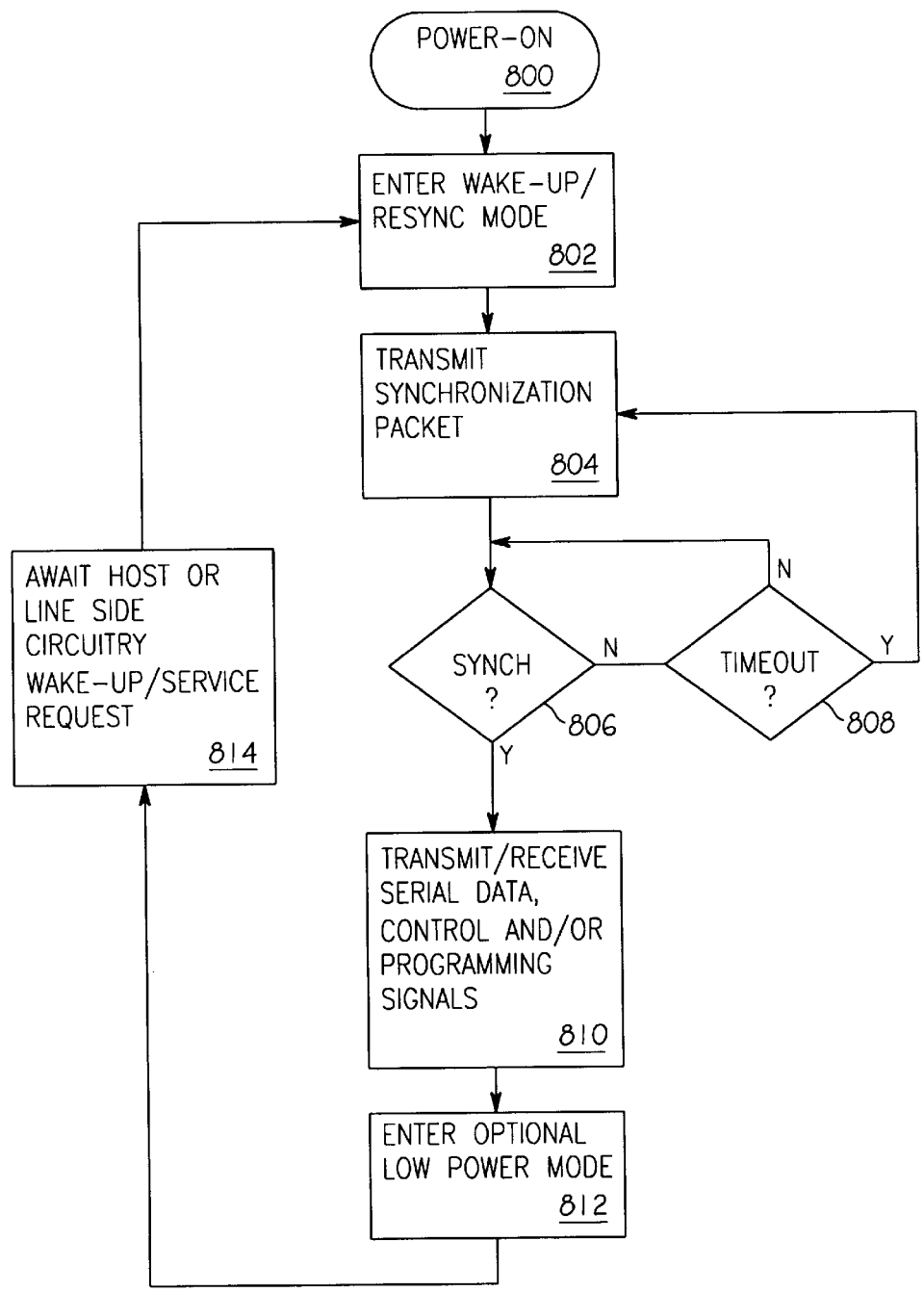
FIG. 8 is a flow chart depicting exemplary serial communication steps, performed by the system side circuitry of FIG. 1, according to the present invention.

FIG. 8 is a flow chart of exemplary serial communication steps performed in accordance with the present invention by one embodiment of the system side circuitry 104 of FIG. 1. Following application of power in step 800, the system side circuitry 104 enters a wake-up or resynchronization mode in step 802. Next, in step 804, the transceiver 132 transmits a synchronization packet. The system side circuitry 104 then awaits signals from the line side circuitry 102 indicating that synchronization has been achieved. If synchronization has not been achieved as determined in step 806, a counter is examined in step 808 to determine if a predetermined time-out value has been reached. If not, the process returns to step 806. If the time-out value has been surpassed, the process returns to step 804 where an additional synchronization packet is transmitted.

If synchronization has been achieved as determined in step 806, the process continues to step 810 where serial data, control and/or programming signals are transmitted or received by the transceiver 132. Following completion of the serial communications, an optional low power mode is entered in step 812. Next, in step 814, the system side circuitry 104 awaits a wake-up signal or service request from either the host system circuitry 116 or the line side circuitry 102. Once such signal is received, the process returns to step 802.

Figure 9:
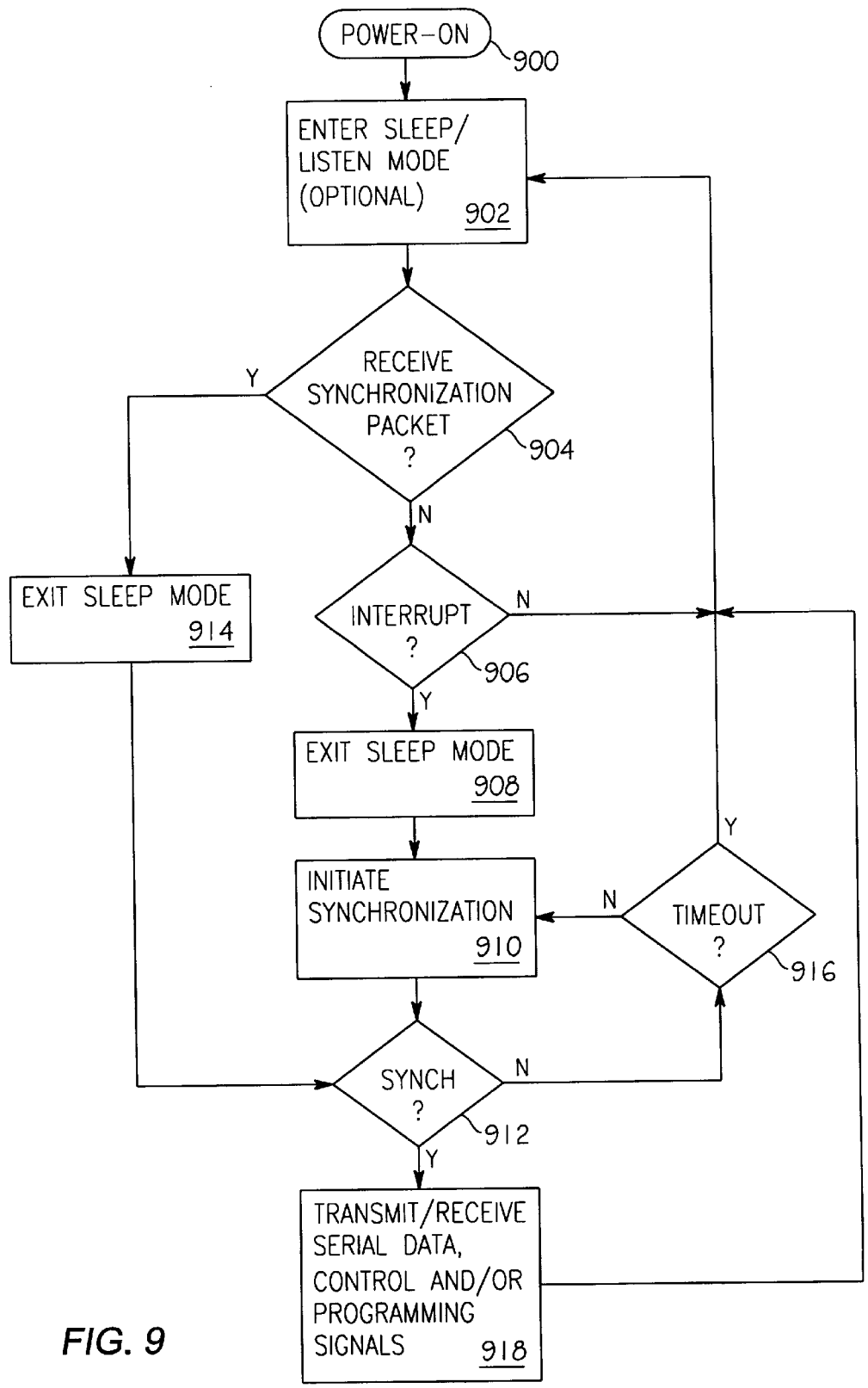
FIG. 9 is a flow chart depicting exemplary serial communication steps, performed by the line side circuitry of FIG. 1, in accordance with the present invention.

FIG. 9 is a flowchart showing exemplary serial communication steps performed in accordance with the present invention by the line side circuitry 102 of FIG. 1. Following power-on in step 900, the line side circuitry 102 enters an optional sleep or listen mode. Next, in step 904, the line side circuitry 102 determines if a synchronization packet has been received from the system side circuitry 104. If not, the line side circuitry determines (step 906) if an interrupt has been generated by any of the circuitry connected to the telephone network 110. If an interrupt has not been received, the process returns to step 902. If an interrupt has been received, the line side circuitry 102 exits sleep mode in step 908. A signal is then communicated to the system side circuitry 104 in step 910 to request synchronization. It is noted that the precise ordering of the steps 904-906 is not considered critical to the invention.

If a synchronization packet has been received as determined in step 904, the line side circuitry 102 exits sleep mode in step 914. Following either of steps 910 or 914, the line side circuitry 102 determines if synchronization with the system side circuitry 104 has been achieved. If not, a time-out counter is examined in step 916 to determine if a predetermined amount of time has expired without synchronization. If not, control turns to step 910 and synchronization is again initiated. If the time-out value has been reached, or if an interrupt was not found in step 906, step 902 is repeated and the line side circuitry enters an optional sleep or listen mode.

Thus, a data access arrangement has been described in which a CODEC is provided in the line side circuitry, such that encoded information generated by the CODEC, as well as information for decoding by the CODEC, is communicated across the high voltage isolation barrier. By placing the CODEC on the system side of the DAA, these communications may be accomplished in a digital manner, thereby permitting a reduction in the size and expense of the high voltage isolation barrier. Further, placement of the CODEC on the line side facilitates communications with other programmable features of the disclosed embodiments of the invention.

In view of the above detailed description of the present invention and associated drawings, other modifications and variations will now become apparent to those skilled in the art. It should also be apparent that such other modifications and variations may be effected without departing from the spirit and scope of the present invention.

APPENDIX A

Copyright © 1998 Conexant Systems, Inc.

SYSTEM SIDE CIRCUITRY

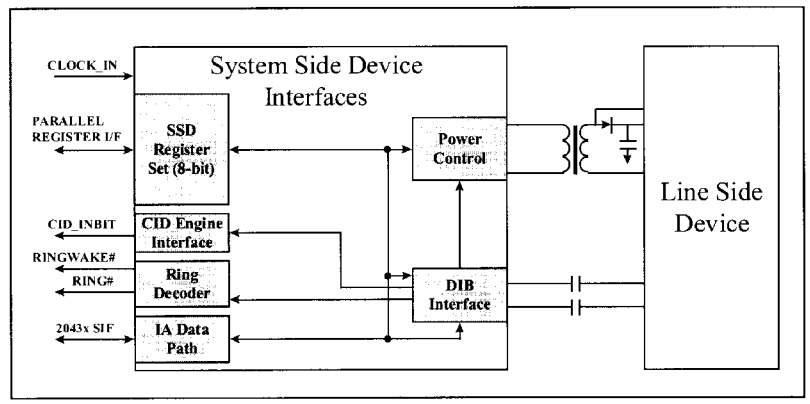

Figure 1. System Side Device block diagram

The System Side device contains the following functional blocks, as shown in Figure 1.

- DIB Interface
- Power Control
- Caller ID Engine Interface
- Ring Decoder (generates RINGWAKE#)
- IA Data Channel (AC Link support TBD)
- System Side Device Register Set The System Side Device, as shown above, consists of two major interfaces. Interfaces (via the DIB) to the Line Side Device are shown to the right, and interfaces to the host device are shown to the left. This document describes one implementation of the data protocol used on the DIB to send and receive data, control, and status information, as well as the DIB power control, CID and Ring interfaces, IA Data Path, and an 8-bit register set available to the host. Existing BASIC logic uses 8-bit registers to interface to the host, with 5 address lines to select registers. The SSD register set directly interfaces to this existing BASIC register logic, using one of the existing unused chip selects.

DIB Data Interface – System Side

Requirements

The DIB protocol is used to pass all required register and control data over the Digital Isolation Barrier, including, at minimum, one Transmit and one Receive Data Word per 16 kHz sample time, control/status bytes, and optional redundant Transmit and Receive Data words. A means of re-transmitting packets received in error should be implemented since no error correction exists at the Line Side Device receiver.

Proposed Implementation
Assumptions

The System Side implementation of the DIB protocol assumes the following:

- The Line-Side Device (LSD) is a slave device to the System Side Device (SSD). The LSD does not initiate a transfer across the DIB unless it is requested, except when asleep.

Note: This implies that any semi-continuous monitoring of Line Side status by the System Side requires the System Side to poll the LSD.

- The Line Side Device will only communicate over the DIB to the System Side Device using the DIB packet protocol (i.e., 4 MHz clock is running), and the Line Side has been synchronized to the System Side.

- When the DIB packet protocol is operational, the System Side Device initiates an FSP based frame every 16 kHz time period.

- If no FSP frame is sent by the SSD, the LSD goes into 'listen' mode. GPIO activity on the Line Side, or an FSP frame sent by the SSD awakens the LSD.

- The System Side Device should write to the power control register (EXMSC, Register 000001) to power down portions of the Line Side Device prior to reducing the clock frequency.

- When a wake up sequence (FSP) is received from the LSD while the Line Side Device is asleep (due to GPIO activity), the System Side immediately raises the clock frequency and begins communicating to the LSD using the DIB Protocol.

- Once synchronization is established across the DIB, both sides can count clock cycles (of the 4 MHz input clock, or the 2 MHz clock derived from it).

- It takes less than two (2) 2-MHz clock cycles for the DIB transceivers to switch from one direction to another. Two information bit times are allocated every time the direction of communication is changed.

- The System Side Device is responsible for generating RING# and RINGWAKE# signals appropriate for the Caller ID Engine, using output from LSD circuits over the DIB. These generated signals should provide Pulse Dial rejection, Extension off-hook rejection, and invalid RING frequency or amplitude rejection.

Bandwidth Summary

Given the 4 MHz clock frequency and the signaling format required across the DIB, a total of 128 information bits may be transmitted across the barrier within a 62.5 microsecond frame (1 sample period, at 16 kHz).

Obviously, within a frame of 128 bits, it is essential to transmit and receive one 16-bit sample of data across the barrier. It is also necessary to provide for a method to transmit control information from the system side to the line side, and transmit status information from the line-side to the system side.

DIB Ping-Pong Protocol Summary

| SSD | FSP | Data1 | Control1 | Data1bis | RSP | S | | | | S | Idle |
|---|---|---|---|---|---|---|---|---|---|---|---|
| LSD | | | | | | S | Data2 | Control2 | Data2bis | S | Idle |
| Frame Bits | 0..3 | 4..21 | 22..39 | 40..57 | 58..61 | 62..63 | 64..81 | 82..99 | 100..117 | 118-119 | 120..127 |

- Figure 2. Bit allocation over the DIB channel for one sample time (frame)

The Ping-Pong Protocol of this implementation is designed to operate in the same manner at all times, in order to simplify system design. It is assumed that sending additional data across the two data capacitors for the full frame requires an insignificant incremental amount of power compared to other send-if-necessary schemes.

As shown in Figure 2, the SSD transmits the Frame Synchronization Pattern (FSP) starting at bit 0 of the 16 kHz frame, then it transmits a data packet, a control packet, and (optionally) another data packet. It ends its transmission with a Reversal Synchronization Pattern (RSP), which signals a reversal of direction to the line side. Both sides then "waste" bits 62 and 63 in order to switch the transceiver transmission direction, then the LSD transmits its own data packet, etc. An alternate frame packet, in which the SSD omits the Data1bis packet, and the RSP follows the *Control1* packet, is allowed for system implementations where the added robustness is not necessary.

In the SSD to LSD direction, the first data packet, *Data1*, consists of the data sample to be transmitted for the current sample period. The next control packet, *Control1* is for control information transmission. Finally, the second data packet *Data1bis*, is intended as a simple error correction (robustness) mechanism: the same data sample (as in the *Data1* packet) is simply retransmitted in this packet.

The LSD follows the same procedure in sending packets to the SSD. The LSD does not reverse the interface to the DIB (i.e., become a transmitter) until successfully receiving the RSP. After enabling its DIB outputs, the LSD sends the *Data2* packet, which consists of the received data for the current sample period. The next packet, *Control2*, is used for status transmission to the SSD and is null unless the SSD requested a Read in *Control1* or a GPIO based interrupt is generated by the LSD. The third packet, *Data2bis*, contains a copy of the data in the Data2 packet, for robustness. If the *Data1bis* packet was not transmitted by the SSD, the LSD omits sending the *Data2bis* packet.

The System Side Device should transmit a second control packet, even if it is not required. If the control packet is not required in one or both directions, a special null control packet will be transmitted. This scheme is necessary to maintain a simple and consistent master-slave relationship in the DIB protocol.

If the SSD only supports the alternate data format (which excludes *Data1bis*), the LSD will detect that the RSP was received before *Data1bis*, and it will also cancel its own transmission of *Data2bis*.

If the Line Side Device receives both the *Data1* and *Data1bis* packets in error, the LSD will use the last error-free received sample for the current frame.

Frame Synchronization Pattern Definition

The Line Side device uses the FSP to generate a sample clock that is synchronized to the System Side device at all times. For all expected HCF and HSF data modem implementations, this sample clock will be 16 kHz, although it could be a lower rate if the System Side simply initiated transmission of the FSP, Data, and Control at longer intervals than 62.5 microseconds.

The Frame Synchronization Pattern (FSP) consists of a fixed pattern of 8 data bits (equivalent to 4 symbols). It is transmitted by the SSD to the LSD at the beginning of each frame. The FSP is designed so that it does not correspond to a valid sequence of '0' or '1' symbols, even if synchronization is lost.

The FSP consists of the following pattern of data bits: 11110000, which correspond to the sequence 'AABB' of symbols.

Reversal Synchronization Pattern Definition

The Line Side device uses the RSP to determine when to reverse transmission on the DIB, and whether it will transmit one or two data packets to the system side.

The Reversal Synchronization Pattern (RSP) consists of a fixed pattern of 8 data bits (equivalent to 4 symbols). It is transmitted by the SSD to the LSD at the end of its transmission (after *Data1bis* or after *Control1*). The RSP is designed so that it does not correspond to a valid sequence of '0' or '1' symbols.

The RSP consists of the following pattern of data bits: 00001111, which correspond to the sequence 'BBAA' of symbols.

Packet Definitions

The following sections show the format for each of the packets sent by or received by the System Side device. The packets are shifted over the DIB from left to right as shown in the tables below, ending with the parity bit.

For simplicity, all packets consist of 18 bits and end with a single parity bit.

Packets Transmitted by the System Side Device

Data1 Packet Definition

| Data | | | 1 | PAR |
|---|---|---|---|---|
| <MSb> | 16 bits | <LSb> | 1 bit | 1 bit |

- DATA: 16-bit sample, with the most significant bit shifted first.

- 1: This symbol is unassigned, and is transmitted as a '1'.

- PARITY (PAR): Parity bit, used for error detection. Odd parity is calculated using the first 17 bits of the packet.

Control1 Packet Definition

| W/R | Address | H/L | Control | 1 | PAR |
|---|---|---|---|---|---|
| 1 bit | 6 bits | 1 bit | 8 bits | 1 bit | 1 bit |

- WRITE/READ (W/R): In a control packet sent by the system side, this bit indicates whether this is a write or a read request. W/R is set to '1' for a write request, to '0' otherwise.

Note that for a read request, the system side device sends a packet with '0' control bits, used to pad the control packet to the full 18 bits.

- ADDRESS: This field contains the address of the control/status register being transmitted.

- HIGH/LOW (H/L): Control bit used to indicate whether the SSD is addressing the upper (high) or lower (low) byte of the 16-bit LSD register. This bit is set to '1' if the high byte is being addressed, to '0' otherwise.

Note: The Line Side Device DIB interface implements logical 8-bit addressing using the Address (6-bit) and H/L bit. The high or low byte is transmitted independently of the other. Thus, the System Side Device need not read or write a high byte following a low byte or vice versa.

- CONTROL: This field contains the control/status byte.

- 1: This symbol is unassigned, and is transmitted as a '1'.

- PARITY (PAR): This bit is a parity bit, used for error detection. Odd parity is calculated using the first 17 bits of the packet.

Data1bis Packet Definition

The contents of the *Data1bis* packet are identical to those of the *Data1* packet.

Packets Received by the System Side Device

Data2 Packet Definition

| Data | | | ERR | PAR |
|---|---|---|---|---|
| <MSb> | 16 bits | <LSb> | 1 bit | 1 bit |

- DATA: When control bit DATAMODE in the Line Side Device MCR register is a '0', the DATA field contains the received 16-bit sample ADC, with the most significant bit shifted first.

When control bit DATAMODE in the Line Side Device MCR register is a '1', the Data consists of the sampled output of the Caller ID and RDO/LPR(and ~LPR) comparators, and the voltage regulator clamp, in the following format. For Caller ID and RING, the 3 bits represent 3 1-bit comparator outputs sampled at 48 kHz. The most significant bit of each field is the 'oldest' bit. Caller ID data and RING data are also available via polling Line Side Register TRSTAT. Note that it is expected that only the most recent of the RDO/LPR and ~LPR output bits will be used, resulting in an effective sample rate of 16 kHz for these outputs.

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| 0 | VCR[2:0] | | | 0 | CID_DATA[2:0] | | | 0 | ~LPR[2:0] | | | 0 | RDO/LPR[2:0] | | |

- ERROR (ERR): If the Line Side device sets this bit, this indicates that an error was detected in the received *Data1* packet originally transmitted by System Side device.

A counter is implemented on the System Side device to track how many times the Line Side indicates an error in transmitted data packets. The host should be able to reset the counter on demand by a write to the counter register.

- PARITY (PAR): This bit is a parity bit, used for error detection. Odd parity will be calculated using the first 17 bits of the packet.

Control2 Packet Definition

| INT | Address | H/L | Control | ERR | PAR |
|---|---|---|---|---|---|
| 1 bit | 6 bits | 1 bit | 8 bits | 1 bit | 1 bit |

- INTERRUPT (INT): The Line Side device sets this bit when an "interrupt" event occurs in the Line Side device register set. The System Side Device should respond to this bit being active by reading the Line Side Device GPIO Status register.

- ADDRESS: This field contains the address of the control/status register being transmitted. In the case of a write, the address written to is echoed back to the System Side Device by the Line Side Device.

- HIGH/LOW (H/L): Control bit used to indicate whether the SSD is addressing the upper (high) or lower (low) byte of a 16-bit LSD register. This bit is set to '1' if the high byte is being addressed, to '0' otherwise.

Note: The Line Side Device DIB interface implements logical 8-bit wide addressing using the Address (6-bit) and H/L bit. The high or low byte is transmitted independently of the other. Thus, the System Side Device need not read or write a high byte following a low byte or vice versa.

- CONTROL: This field contains the control/status byte to be written/read.

In the case of a response to a write, the control byte written to the Line Side Device is echoed back to the System Side Device. If the echoed byte does not match the original byte written by the SSD, the SSD automatically does not set the 'OK' bit in the LSDSTAT register ($00), and instead increments the ERRCNTL2 counter.

- ERROR (ERR): If the Line Side device sets this bit, this indicates that an error was detected in the received *Control1* packet originally transmitted by System Side device.

A counter is implemented on the System Side device to track how many times the Line Side indicates an error in transmitted data packets. The host should be able to reset the counter on demand (by writing to it). Since erroneously received control packets are discarded by the Line Side Device, the System Side Device retransmits these packets during the next frame.

The SSD increments the ERRCNTL1 counter, and automatically re-transmit the control packet which failed. Successive failures will continue to increment the ERRCNTL1 counter until the counter overflows (reaches a hex value of 'F'). This overflow will cause the SSD to set the DIBFAIL status bit, and to generate a host interrupt (masked using the IMASK register). It is expected that the host driver software will reset the clock output to the LSD, resetting it and causing it to go on-hook.

- PARITY (PAR): This bit is a parity bit, used for error detection. Odd parity will be calculated using the first 17 bits of the packet.

Note: If the SSD finds a parity or non-legal symbol error in the *Control2* packet, all bits in the packet, including INT, are discarded.

Data2bis Packet Definition

The contents of the *Data2bis* packet are identical to those of the *Data2* packet. The only difference is that the ERR bit is only set if the LSD detected an error in the *Data1bis* packet received.

DIB Synchronization – System Side

Synchronization will be achieved/maintained between the SSD (master) and LSD (slave) by means of a special sequence of symbols (the FSP) sent by the System Side device at the beginning of each frame or whenever synchronization is lost. When sufficient power is present (i.e., the power clock is being received), the LSD will always respond to a frame that begins with the FSP. When power is present, but the LSD is 'asleep', GPIO activity will cause the LSD to send FSP to the SSD, to request wake-up. A state-diagram is included in Figure 3 below:

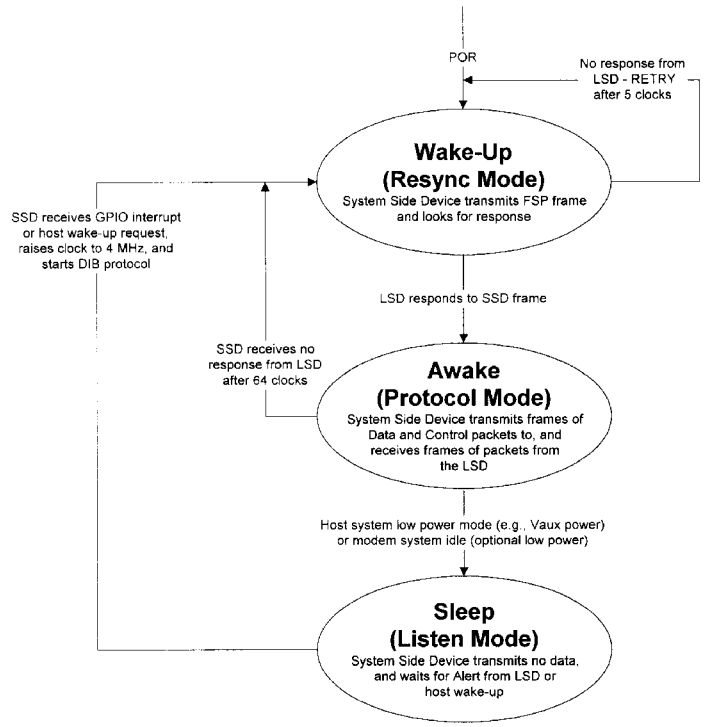

Figure 3. System Side Device DIB States

DIB Power On Reset

When the system is powered up, the System Side DIB interface defaults to Resync Mode, in which it is a transmitter, sending a frame of data and control information to the LSD. The System side waits for a normal response from the LSD to indicate that the DIB and LSD are operational. The System Side device then enters normal operation (Protocol Mode), sending a frame of data and control information to the LSD each frame (sample) time. Each time it completes transmission of the frame, the system side reverses the DIB and "listens" for the return packets from the LSD. If it does not receive anything within the following 5 bit times, synchronization between the two devices has been lost, and the SSD reverses the DIB again and re-transmits the frame (having re-entered Resync Mode).

Cold Reset

The System Side Device may at any time perform a cold reset of the LSD by stopping the power clock altogether for a predetermined number of milliseconds, allowing the VDD voltage of the LSD to dissipate. The System Side may then re-start the Line Side Device by turning on the clock and performing the synchronization described above. This reset mechanism is slow and should be used only as a last resort. Alternatively, the System Side Device may write to the LSD's ID register (VEN1, Register 16) to reset all register bits to default status.

System Side Wake-Up Summary

If the Line Side is 'asleep' (i.e., the device is in Listen Mode and the power clock is 140 kHz) and activity is detected from any GPIO configured to generate an interrupt, the Line Side will generate an alerting signal to the System Side Device. Immediately after alerting the SSD, the LSD will switch its interface to receive mode.

The alerting signal will consist of 4 symbols, 'AABB', at the 70 kHz bit rate (1/2 the power clock). This will correspond to data bits of '11110000'. Note that 'A' and 'B' have been chosen as noise tolerant special signals because they generate a transmit signal which is a sub harmonic of the 140 kHz power clock and the 70 kHz bit clock and will therefore be unlikely to be generated by board or clock noise.

Upon detection of the activity on the DIB data lines, and verification of the 'AABB' signal, the System Side device raises the power clock frequency to 4 MHz, and begins transmitting a frame beginning with FSP.

System Side Error Detection

The System Side can detect and track several types of errors in the transmitted and received data and control packets, as described below. Eight error counters exist in the System Side Device to track DIB performance. Six counters are dedicated to data errors for the six defined packets for the DIB (*Data1*, *Data2*, *Control1*, *Control2*, *Data1bis*, and *Data2bis*). Two more counters are used to count synchronization errors over the DIB.

Errors in the Data

The System Side Device increments one of three error counters based on incorrectly received *Data2*, *Control2*, or *Data2bis* packets from the Line Side Device. If the received packets are error free, then the System Side Device increments the three error counters corresponding to the *Data1*, *Control1*, and *Data1bis* packets sent from the SSD to the LSD, depending on the status of the ERR bits in each of the received packets from the LSD.

Errors can consist of non-legal data symbols, or parity errors, as described below.

Non-Legal Data Symbols

If the System Side receives an 'A' or 'B' signal at any time other than when the Line Side Device is asleep, one of two types of errors has occurred. Either one half of one symbol ('0' = '01' or '1' = '10') has been corrupted, resulting in a half-symbol error, or there has been a loss of synchronization due to a clock slip on the DIB. Both will be treated as a non-legal Data Symbol.

In the case of a clock slip, the DIB will be re-synchronized by the next FSP based frame sent by the System Side Device, so no special action is necessary.

If the Line Side Device has received an 'A' or 'B' signal at any time after the reception of the FSP, and before RSP, either one half of one symbol has been corrupted, or there has been a loss of synchronization due to a clock slip on the DIB. The Line Side Device will determine which error has occurred by if/when the RSP is received.

If the RSP is received on time, the Line Side device detects a Non-Legal Data Symbol error, and communication over the DIB continues without a resynchronization. The Line Side device reacts by using the other data packet or discarding the control packet, as appropriate, and sets the appropriate ERR bit in its frame response (which the SSD will count, as described above). If the RSP is received late or not at all, then the LSD will respond to the error by going to Listen Mode until the SSD sends another frame. Thus, the error will then be detected as a synchronization error.

Parity Errors

If, at the end of the *Data2*, *Control2*, or *Data2bis* packets, the Parity bit for the first 17 bits in the packet does not agree with the SSD calculated parity of the data in the packet, then a Parity Error is detected. A Parity error in this case indicates that an odd number of symbols have changed from '0' to '1' or vice versa. The SSD will then increment the error counter corresponding to the appropriate received packet. If the Parity bit of any packet is received as an 'A' or 'B' symbol, it is corrupted and the System Side detects a Non-Legal Data Symbol error.

If, at the end of the *Data1*, *Control1*, or *Data1bis* packets, the Parity bit for the first 17 bits in the packet does not agree with the LSD calculated parity of the data in the packet, then the Line Side Device detects a Parity Error. If the Parity bit of any packet is received as an 'A' or 'B' symbol, it is corrupted and the Line Side detects a Non-Legal Data Symbol error. The Line Side Device reacts by using the other data packet or discarding the control packet, as appropriate, and sets the appropriate ERR bit in its frame response (which the SSD will count, as described above).

Time Out and Synchronization Errors

In some cases, the Line Side response to an error is to stop communicating with the System Side device. This indicates that the System Side device should re-awaken the Line Side device with a frame beginning with FSP. At each occurrence (other than POR), the System Side increments an error counter indicating that the LSD synchronization was lost.

Also, during the Wake Up sequence it is possible for the Line Side Device to miss the System Side synchronization signal, 'AABB'. This will require the SSD to resend the frame. In this case, the SSD should increment the eighth error counter, allowing the system to track how long it takes to resynchronize the DIB at initial power up, wake-up, or during a loss of synchronization.

In the event of a wake-up, it is important that the LSD and SSD do not wait the same number of clock cycles (5 cycles of the 2 MHz bit clock) before re-transmission. This will prevent repeated collisions on the DIB of the SSD FSP and the LSD Alerting signal (FSP), and subsequent failure of the system to wake up.

Error Condition Pseudo-Code

The following pieces of pseudo-code show how the System Side implementation of the DIB protocol handles various error conditions.

If System side detects error in *Data2* then
    System side uses data sample in *Data2bis* instead;
    System side increments *Data2* error counter.
Endif If System side detects error in *Data2bis* then
    System side uses old receive sample;
    System side increments *Data2bis* error counter.
Endif If System side detects error in *Control2* then
    System side resends control packet in *Control1* of the following frame;
    System side increments *Control2* error counter.
Endif If System side receives ERR in *Data2* then
    System side increments *Data1* error counter.
Endif If System side receives ERR in *Data2bis* then
    System side increments *Data1bis* error counter.
Endif If System side receives ERR in *Control2* then
    System side increments *Control1* error counter.
    System side resends control packet in *Control1* of the following frame;
Endif If (line side loses synchronization (loss of clock, no FSP, etc...))
    Line side stops transmission;
    System side detects loss of contact;
    System side re-transmits frame;
    System side increments synchronization error counter;
    Line side detects FSP;
    Communication resumes;
Endif If System side receives no reply to FSP during (re)synchronization
    System side times out;
    System side re-transmits frame;
    System side increments synchronization retry error counter;
    Line side detects FSP;
    Communication resumes;
Endif

System Side Interrupt Detection/Handling

A number of Line Side circuits can require SSD event handling on an interrupt (or system wake-up) basis. Since only GPIO can generate interrupts (using the AC'97 specification as a model), all such circuits will be connected to LSD GPI. By default, the circuits which should be able to interrupt the SSD are the Caller ID detector and Ring detector comparators. Any activity (edges) from these circuits should be detected to allow the system to wake up (at least partially) and validate ring and/or Caller ID data.

The System Side Device responds to all interrupt events received over the DIB. The System Side Device uses an interrupt mask register to determine if interrupt events should be relayed to the host.

Detection Methods

When DIB Protocol is active (Protocol Mode)

When the DIB protocol is running, the Line Side Device provides a means of interrupting the host via the INT bit in the *Control2* packet. To enable these features, the GPIO should be powered on (in the LSD EXMSC register), the GPIO direction should be programmed to 'input' (default), the GPIO Sticky register should set the GPI to be edge sensitive, the GPIO Wake up mask should enable the GPI to generate interrupts, and the DATAMODE control bit in the LSD MCR register should be set to a '1'.

Then, when an edge is detected on any of these interrupt generating GPI, the GPIO Status register will contain a '1' for the input that generated the edge, and the LSD will return a '1' for the INT bit in the *Control2* register. The LSD will continue to return INT=1 until the host/SSD writes to the GPIOS register, resetting the sticky bit corresponding to the interrupt.

On reception of the *Control2* register, the SSD will detect INT=1, and will set the corresponding INT bit in the LSDSTAT register and activate a hardware interrupt line if the INTE control bit is set to '1'. It is expected that this hardware interrupt line will be routed to the Host for most projects.

When DIB Protocol is inactive (Low Power Mode)

Alternatively, when the system is asleep (with the 140 kHz clock running), the Line Side Device may interrupt the SSD by sending an FSP ('AABB') sequence of signals over the DIB.

The SSD will detect the signal from the LSD, raise the clock on the DIB interface to 4 MHz, and send a full frame beginning with FSP to the LSD. This frame should consist of a Control channel Read of the LSD GPIOS register.

After synchronization between the two devices, the interrupt detection mechanism will proceed as described in Section 0.

Handling Required Interrupts

Three interrupts are necessary to overall system function. They are the Ring Detector, Line Polarity Reversal Detector and Caller ID Detector interrupts (GPI1, GPI2 and GPI0, respectively, for the LSD).

Ring Detection

Since the System Side Device will generate the RINGWAKE# signal for the Caller ID Engine, it is necessary for the Ring Detector output to:

(1) Cause an interrupt to the SSD.

(2) Wake up the DIB if not already in Protocol Mode.

(3) Process the sampled RDO/LPR bit stream from the LSD.

(4) Provide the RINGWAKE signal to the Caller ID Engine.

Thus, while the System is under Vaux power, with only 140 kHz over the DIB, the incoming Ring generates an interrupt over the DIB (LSD will send FSP to SSD). The SSD then raises the DIB clock to 4 MHz, and synchronizes with the LSD. The host is not running, and may take several seconds to awaken. The SSD may automatically detect that the Interrupt source is GPI1 (RDO/LPR) or GPI2 (~LPR), set the DATAMODE bit in LSD register MCR, and begin sending the RDO/LPR samples to the Ring Decoder.

The Ring Decoder then determines if the incoming Ring/LPR activity is valid. If so, RINGWAKE# will be asserted to the Caller ID Engine. If not, the DIB will be put back into Low Power Mode (140 kHz clock) after resetting the interrupt.

When the System is in Protocol Mode, fully awake (host, SSD, and LSD all running normally), and on-hook, the DATAMODE bit should be a '1', and the RDO/LPR bits should be passed directly (after inversion) to the host/DSP as RING#. This will provide a half-wave rectified Ring Detector output for the host to use/process when Ring is received. In this case, the Caller ID Engine is not used.

CID Detection/Decode (D3Cold)

The Caller ID Detection/Decoding circuitry may work for the D3Cold case, in which the host is not functioning, the SSD and LSD are idle, and the DIB is running with the reduced clock (140 kHz). When activity is received from the Caller ID detector output on the LSD, this may:

(1) Cause an interrupt to the SSD.

(2) Wake up the DIB if not already in Protocol Mode.

(3) Cause the CID_DATA output bits (48 kHz sample rate, 1-bit per sample) to be routed to the Caller ID Engine input (waking the Caller ID Engine).

While the system is under Vaux power, with 140 kHz over the DIB, the incoming Caller ID Data generates an interrupt over the DIB (the LSD will send FSP to the SSD). The SSD will then raise the DIB clock to 4 MHz, and synchronize with the LSD. The host is not running, and may take several seconds to awaken. Therefore, the SSD may automatically detect that the interrupt source is Caller ID (would appear to be GPI1 or GPI2 – same as Ring), set the DATAMODE bit in LSD register MCR, and begin sending the CID_DATA samples to the Caller ID Engine.

The Caller ID Engine then determines if the incoming Caller ID data is valid. If so, the Caller ID Engine will assert a PME event, waking the host system, and store up to 256 bytes of Caller ID data. This functionality is already present in the BASIC 2.15 device and will require little if any change. If the Caller ID Engine determines that the data is not valid, the DIB will be put back into Low Power Mode (140 kHz clock) and the Caller ID Engine will reset to idle state, after resetting the interrupt.

When the System is in Protocol Mode, fully awake, and on-hook, the Caller ID Detector in the LSD is not used. Instead, the 16-bit samples received from the line via the IA will be routed directly to the DSP/Host for processing. This requires that the DATAMODE bit in the LSD MCR register be set to a '0'.

Handling Other Interrupts

The system implementation is able to handle other, as yet unspecified, interrupts. This will allow the addition of new features without changing the SSD or LSD design. Such new features, if necessary, generate interrupts. These interrupts can, if needed, generate a host interrupt by setting the interrupt mask registers (IMASKx) and interrupt enable bit (INTE) in the LSDSTAT register.

Unintentional Off-Hook

If an off-hook detector is added to the LSD, the output of this detector may be routed to a GPI, and used as an interrupt to the System Side Device.

If no detector is added to the LSD, the System Side Device to periodically raises the Clock to 4 MHz to detect if the Line Side Device is drawing current (or if an extension is off-hook). Then the SSD will configure the Monitor ADC to measure the voltage at Tip/Ring, and generate an interrupt to the Host/BASIC if this voltage is below a pre-determined threshold. If not, the DIB clock will be reduced back to 140 kHz and both SSD and LSD will return to Sleep state.

Therefore, although the function can be implemented, this capability will not use a pre-assigned GPI or generate an interrupt over the DIB from the LSD to SSD.

Active Power Control

A means for Active Power Control exists in the current Line Side Device. An automatic voltage clamp is provided, which prevents the VDD voltage on the Line Side Device from exceeding 5.4 VDC. When the voltage exceeds this limit, bit VCR is set to a '1', and current is shunted from the VDD power supply through the clamp circuit, to reduce VDD. This output is connected to GPI3 of the Line Side Device and may be configured to cause an interrupt to the SSD.

If this interrupt is received, while the DIB clock frequency is 140 kHz, then the LSD will generate an interrupt over the DIB (LSD will send FSP to SSD) if the LSD GPIO registers are programmed to generate an interrupt from GPI3. The SSD will then raise the DIB clock to 4 MHz, and synchronize with the LSD.

At this time the host software will reprogram the SSD drivers to provide less drive current, thereby lowering the VDD voltage on the LSD. This will require that the host software: (1) read the VDD voltage using the 6-bit monitor ADC on the LSD; (2) change (lower) the drive current of the power supply/clock on the DIB; and (3) read the VDD voltage again, repeating until the VDD voltage is reduced to the desired operating range.

If such active power control is not necessary, GPI3 on the LSD need not be programmed to generate interrupts, in which case the LSD voltage clamp circuit will automatically limit LSD VDD to about 5.4 VDC. In this case the LSD device will consume excess current when the voltage clamp is shunting/clamping VDD. This may not be practical for low power modem implementations (e.g., in portable computers).

DIB Power Interface – System Side

Requirements

The System Side Device functions as the source of both the master data clock and the power for the Line Side Device. The master data clock consists of one or two drive frequencies. Since LSD Power will also be derived from this clock, the master clock may also be able to provide several different drive current levels as needed for different operating/power consumption modes of the Line Side Device.

In addition, the SSD may be able to monitor the Line Side Device power status to prevent under or overdriving the voltage input of the Line Side Device.

Proposed Implementation

The System Side Device includes one 8-bit Clock/Power Control register, CLKPWR. This register includes:

| Name | Bit# | Description | Default |
|---|---|---|---|
| Clks High | 0-2 | Controls the duty cycle of the output clock/power. '000' or '111' = 50% duty cycle. '001' – '110' = 1 to 6 7ths high, 6 to 1 7ths low. This control can be used to control the total amount of power delivered to the LSD. | 000 |
| Freq | 3 | Controls output clock frequency. '1' = 4.096 or 4.032 MHz '0' = 140 kHz | 1 |
| Power Out | 4-6 | Controls clock output driver current. '000' = maximum driver current, '001'-'111' = TBD | 000 |
| Clken | 7 | Controls clock output driver. '1' = enable, '0' = disable (both outputs may be held high or low) | 1 |

The System Side Device monitors the Line Side Device voltage in two ways. First, the output of the LSD VDD voltage clamp circuit (VCR) is connected to GPI3. This output will be a '1' when the LSD voltage exceeds 5.4 VDC and the clamp is actively controlling Line Side voltage. The LSD will be configured to generate an interrupt when this GPI is a '1', or when a rising edge is encountered. This will allow the SSD to detect when the power output to the LSD is more than required.

Second, the System Side Device can be used to measure the Line Side supply voltage. The Line Side device contains a Monitor ADC (6-bits) which can be connected to the voltage supply rail (using a resistor divider to scale the VDD down to the 0V – 3.5V domain of the ADC). The host can use this Monitor ADC to periodically check the Line Side Device VDD and to adjust the output current or frequency of the clock used to power the LSD accordingly.

The output of the voltage clamp is also available to the SSD by setting the DATAMODE bit to a '1' in the LSD MCR register, and checking bit 12 of the 16-bit RX data word at each sample time. Or, when DATAMODE is a '0', the SSD can read the LSD TRSTAT register (upper half) and check bit 4 of the byte that is read.

CID Engine Interface

Requirements

In D3Cold mode, the Caller ID Engine in the BASIC 2.xx device is used to receive and store up to 256 bytes of Caller ID data from the phone line interface while the host is not available. The System Side Device may translate Caller ID data from the Line Side Device (via the DIB data lines) into a format compatible with the Caller ID Engine already implemented in the BASIC 2.xx device.

When the system is not in D3Cold mode, the HSF host software or HCF data pump device will receive 16 bit data words from the IA (via the *Data2/Data2bis* packets) and decode the FSK data. The Caller ID Engine is not used in this case.

Proposed Implementation

The Line Side Device samples the incoming analog Caller ID signal (when control bit ~RD/CID in the MONADC register is a '1') at a 48 kHz rate. The resulting 1-bit samples will be placed into the LSD TRSTAT register, and if the DATAMODE bit in the LSD MCR register is a '1', the TRSTAT register will be transmitted to the SSD in the *Data2* and *Data2bis* packets.

To enable the 48 kHz 1-bit serial path from the SSD Caller ID Engine Interface output to the BASIC device (CID Engine input), the CIDEN bit may be set to a '1' in the CIDENGCTL register. Received CID_DATA bits (3 at a time) from the DIB are copied to the CID_DATAx[2:0] fields of the CIDENGCTL register. Two such fields are defined. Thus, there will be no conflict between the writing of the newest group of 3 bits by the SSD logic and the reading of any of the bits by the shift register which outputs the bits to the BASIC device.

The default values for both CID_DATAx fields, as well as CIDEN and PING/PONG bits in the CIDENGCTL register, are '0'. After CIDEN is set to '1', bits 8-10 of the *Data2* (or *Data2bis*, if *Data2* contains an error) are copied to the CIDENGCTL register. When the PING/PONG bit is a '0', the three bits are copied to the CID_DATA1 field of the register, and the PING/PONG bit is set to a '1'. When the PING/PONG bit is a '1', the three bits are copied to the CID_DATA2 field of the register, and the PING/PONG bit is reset to '0'.

When the CIDEN bit is a '1', and the PING/PONG bit has changed state, the SSD will begin shifting the most recently received bits (oldest bit first) out to the CID Engine in the BASIC device, using the 48 kHz clock. At the 4$^{th}$ (and subsequent) clock after the three bits begin to be shifted, if the PING/PONG bit has not changed state, the output to the CID Engine remains constant.

This output is connected to the CID_INBIT connection of the BASIC device during development. For production, the sampling stage of the CID Engine is bypassed. The CID Engine and CID Engine Interface use the same 48 kHz sample clock and are automatically synchronized, therefore, no re-sampling of the data (and associated error) is required.

When the CIDEN bit is reset to '0', the CID_DATAx and PING/PONG bits is reinitialized to '0'.

Note that if the CIDEN bit is a '1' when the LSD DATAMODE bit is a '0', the *Data2* packet will contain 16-bit received data words from the IA, and therefore the bits in the CID_DATAx fields will be invalid.

Upon receipt of the CID_DATAx data, the Caller ID Engine determines if the incoming Caller ID data is valid. If so, the Caller ID Engine will assert a PME event, waking the host system, and store up to 256 bytes of Caller ID data. This functionality is already present in the BASIC 2.15 device and will require little if any change. If the Caller ID Engine determines that the data is not valid, the DIB will be put back into Low Power Mode (140 kHz clock) and the Caller ID Engine will reset to idle state, after resetting the interrupt.

RING#/RINGWAKE# Generation

A description of the differences between a "classic" Ring Detect circuit, and the RDO/LPR (Ring Detect Out/Line Polarity Reversal) circuit is in order, to explain the requirements of the RING# and RINGWAKE# signals as already developed by Systems Engineering.

In the "classic" Ring Detect circuit, the ring detector consists of a bi-directional opto-isolator, and zener diodes to set the ring detect threshold. These components are AC coupled to the line via a series capacitor. If the ring signal exceeds the zener regulating voltage, the signal reaches the opto-isolator input stage. The bi-directional opto-isolator provides full-wave rectification of the signal, resulting in a square wave with fundamental frequency component at twice the ring frequency. Between rings, the opto-isolator output is inactive. Variations on this circuit, which use a unidirectional opto-isolator to produce a half wave rectified ring voltage, also exist.

The Line Side Device derives these signals from the Ring signal differently. Two sets of comparators, both AC coupled to the line, are used. The only difference between the two comparators is the reference voltage polarity. The comparators use a programmable (via a 6-bit DAC) reference voltage, which sets ring detect threshold. In this manner, the system can adapt to country specific ring voltage threshold requirements via a simple host programmable command.

Requirements

A ring voltage with AC amplitude above the programmed threshold will produce complementary half-wave rectified square waves on each comparator output with the fundamental frequency of the ring signal (nominally 20 Hz). A Line Polarity Reversal (a single step change in Tip/Ring voltage from polarity A to polarity B, or vice versa) will produce a single pulse on one comparator output or the other. A pulse dial will produce a nominal 10 Hz output from both comparators.

The comparator outputs are sampled at a 16 kHz rate by the LSD, and placed in the LSD TRSTAT register. When the DATAMODE control bit in the LSD MCR register is a '1', the TRSTAT register is copied to the Data2 and Data2bis words, replacing the received 16 bit word from the IA. Thus, the SSD can only do useful ring detection when the DATAMODE bit is a '1'. This should be the desired mode when the host system is asleep

Proposed Implementation

The Line Side Device samples the incoming analog ringing signal from both comparators (when control bit ~RD/CID in the MONADC register is a '0') at a 16 kHz rate. The resulting 1-bit samples will be placed into the LSD TRSTAT register, and if the DATAMODE bit in the LSD MCR register is a '1', the TRSTAT register will be transmitted to the SSD in the Data2 and Data2bis packets.

The SSD will begin shifting the most recently received bit from the RDO/LPR field of the TRSTAT (in Data2/Data2bis) out to the BASIC and/or data pump devices for HSF or HCF designs, respectively, using the 16 kHz clock (the same clock used for FSP generation). In the event that both the Data2 and Data2bis packets are received in error, the ring output remains constant until the next sample (frame) is received from the DIB. Note that the output should be inverted, since the BASIC device expects a RING# signal (negative active) and the LSD produces a positive active output from the comparator.

For D3Cold ring detection (and subsequent D3Cold Caller ID detection), the RING# signal from the SSD will be used by the BASIC device to produce a RINGWAKE# signal for the Caller ID Engine.

In addition to the RING# output, the RINGWAKE# generation logic in the BASIC device should be able to identify a Line Polarity Reversal for Japanese and British Caller ID reception. The Line Side Device design requires that both RDO/LPR and ~LPR be monitored to reliably detect LPR. Thus, the ~LPR output should also be shifted out to the BASIC device at each sample time (when the RDO/LPR logic is sent). A glitch on either (but not both) comparator outputs, with no further activity will indicate a large step change in voltage and can be identified as a LPR. This type of input should cause RINGWAKE# to be active low for the required time to wake the Caller ID Engine.

Note that if the DATAMODE bit is a '0', the Data2 packet will contain 16-bit received data words from the IA, and therefore the bits in the RDO/LPR and ~LPR fields will be invalid.

Upon receipt of the RING# data, and subsequent transformation to RINGWAKE# in the BASIC device, the Caller ID Engine determines if the incoming events should wake the PC via a PME event. If not, the DIB will be put back into Low Power Mode (140 kHz clock) and the Caller ID Engine will reset to idle state, after resetting the interrupt.

Development System Consideration

The CID Engine in an earlier device does not receive this ring signal directly. Rather, a secondary signal, RINGWAKE#, which is derived from RING#, may be supplied via an external comparator circuit.

In future developments, it is expected that the CID_Engine will be able to accept RING# as an input directly.

For maximum compatibility, this feature should be retained, so that future projects may use either RING# or RINGWAKE# output from the SSD as an input to other logic (such as the CID Engine).

Call Progress Monitor

The System Side Device logic may provide a Call Progress Monitor function. This function generally does not exist on the Line Side Device or on the LSD side of the DIB simply because of the power required to run a speaker driver.

Requirements

The SSD Call Progress Monitor provides an audible monitor output for the end user. This output will be routed to a speaker, allowing the user to monitor call progress functions such as dial tone, dialing, busy or error tones from the telephone company. Also, this circuit will allow monitoring of standard modem call progress including handshake, negotiations, and communications portions of a modem transaction, depending on the call progress AT command (ATMx) issued by the user to the system.

The Call Progress Monitor is routed to a single digital output pin. This pin will be connected to a small speaker or Sounducer, either directly or via a series RC network to filter the output as required for the system.

Proposed Implementation

This feature may use either the RXA signal from the Line Side Device, or the TXA signal from the System Side Device (or both), as a source. These signals are present in the System Side Device in the *Data2, Data2bis, Data1,* and *Data1bis* packets during each frame, if the DATAMODE bit in the LSD MCR register is a '0'.

Using RXA as a signal source implies that the output of the Call Progress Monitor will consist of the Received analog signal, plus a portion of the Transmit signal, reflected from the line interface. The magnitude of the Transmit signal for monitoring is wholly dependent on the degree of mismatch between the LSD DAA circuits and the actual telephone line interface. Using TXA as a signal source implies that the output of the Call Progress Monitor will consist only of the Transmitted analog signal.

The output of the Call Progress Monitor will consist of the sign bit of the received 16-bit data word in the *Data2/Data2bis* or *Data1/Data1bis* packets, depending on the CPMSRC control bits. For the RXA CPM, if the output of the 16-bit sigma delta ADC in the LSD contains no DC component, and the received signal is of sufficient magnitude, CPM will consist of a waveform consisting primarily of the fundamental component of the received signal. Note that the output of the ADC in past products has generally contained a DC component. Since the TXA signal is digitally provided to the SSD from the host, it is expected to have no DC component.

If testing, prior to final System Side Device integration, reveals a better solution than the above, it should be implemented.

System Side Device Register Set (Proposed)

Requirements

Two types of registers exist: System Side Device registers which directly affect system side logic, and Line Side Device registers which are accessed by the System Side Device over the DIB and relayed to the host. The former can be read from or written to in one normal ready/write cycle. The latter require several read/write cycles simply due to the DIB architecture and latency. Errors in transmission of data across the DIB can increase this latency in multiples of the frame clock (1/16 kHz time periods). In an ideal DIB implementation (which never experiences DIB channel errors), the maximum delay for these indirectly accessed LSD registers is 2 x 62.5, or 125 microseconds.

When the host writes to a Line Side Device register, the System Side should initiate a write across the DIB. If the host is only capable of 16 bit writes, then the System Side may cache ½ of the write, and implement the host write as two 8-bit writes across the DIB. If the host is capable of 8-bit writes (recommended), then the System Side Device can implement the write directly as one 8-bit write across the DIB. The host may then begin polling the SSD to determine if the write was completed without error. One register (LSDSTAT) will be used for feedback to the host regarding the status of such writes.

When the host reads from a Line Side Device register, the System Side intiates a read across the DIB. If the host is only capable of 16-bit reads, then the System Side may cache ½ of the read, and implement the host read as two 8-bit reads across the DIB. If the host is capable of 8-bit reads (recommended), then the System Side Device can implement the read directly as one 8-bit read across the DIB. The host may then begin polling the SSD to determine if the read has been completed without error. If so, the host can then read the LSD shadow register a second time to get the most recently read data. This can allow frame-by-frame polling of the same LSD register by simply initiating a read, waiting until the data is ready (by polling the LSDSTAT register), then reading the new data (which initiates another read), etc.

Proposed Implementation

The following proposed implementation provides control and status functionality known to be required as of this writing.

| Short Name | Reg. # | Read/ Write | Default Value (Hex) | Bits | | | | | | | |
|---|---|---|---|---|---|---|---|---|---|---|---|
| | | | | D7 | D6 | D5 | D4 | D3 | D2 | D1 | D0 |
| MISC | 14 | R/W | 00 | PDM | LISTEN | CID_RSS[1:0] | | X | DIB FAIL | CPMSRC[1:0] | |
| RXDATAH | 13 | R | 00 | Current RX word, high byte (RXDATA[15:8]) | | | | | | | |
| RXDATAL | 12 | R | 00 | Current RX word, low byte (RXDATA[7:0]) | | | | | | | |
| TXDATAH | 11 | R/W | 00 | Current TX word, high byte (TXDATA[15:8]) | | | | | | | |
| TXDATAL | 10 | R/W | 00 | Current TX word, low byte (TXDATA[7:0]) | | | | | | | |
| CIDENGCTL | 0F | R[(2)] | 00 | CIDEN | CID_DATA2[2:0] | | | PING/ PONG | CID_DATA1[2:0] | | |
| ERRRETRY | 0E | R[(1)] | 00 | Counter[7:4] | | | | Counter[3:0] | | | |
| ERRSYNC | 0D | R[(1)] | 00 | Counter[7:4] | | | | Counter[3:0] | | | |
| ERRD2b | 0C | R[(1)] | 00 | Counter[7:4] | | | | Counter[3:0] | | | |
| ERRCNTL2 | 0B | R[(1)] | 00 | Counter[7:4] | | | | Counter[3:0] | | | |
| ERRD2 | 0A | R[(1)] | 00 | Counter[7:4] | | | | Counter[3:0] | | | |
| ERRD1b | 09 | R[(1)] | 00 | Counter[7:4] | | | | Counter[3:0] | | | |
| ERRCNTL1 | 08 | R[(1)] | 00 | Counter[7:4] | | | | Counter[3:0] | | | |

| Name | Reg. | R/W | Def. | | | | | | | | |
|---|---|---|---|---|---|---|---|---|---|---|---|
| ERRD1 | 07 | R⁽¹⁾ | 00 | Counter[7:4] | | | | | Counter[3:0] | | |
| CLKPWR | 06 | R/W | 08 | CLKEN | PWROUT[2:0] | | | FREQ | CLKSHIGH[2:0] | | |
| IMASK | 05 | R/W | 00 | X | X | X | X | X | ERR FULLM | LSD GPIOM | CNTL RDYM |
| ISRC | 04 | R/W | 00 | X | X | X | X | X | ERR FULLA | LSD GPIOA | CNTL RDYA |
| LSDADDR | 03 | R/W | 00 | W/R | ADDR[5:0] | | | | | | H/L |
| CNTLOUT | 02 | R/W | 00 | CONTROLOUT[7:0] | | | | | | | |
| CNTLIN | 01 | R | 00 | CONTROLIN[7:0] | | | | | | | |
| LSDSTAT | 00 | R/W | 00 | INT | INTE | FINI | OK | X | RX | TX | WAIT |

Notes:

(1) Error Counter registers (06h through 0Dh) are automatically incremented by the SSD, and functionally read-only. Any write to an error counter register will reset the particular error counter register to 00h.

(2) The SSD Caller ID Engine Control register is read-only except for bit 7 (CIDEN), which is read/write capable. A write to bit 7 resets bits 6 through 0 to '0'.

All bits shown in dark gray are not required in the first device and need not be implemented. Such bits are placeholders in the specification for expected future expansion.

System Side Device Register Bit Definitions

| Name | Reg. | Def. | Description |
|---|---|---|---|
| ADDR | 03:[6:1] | 00h | DIB Control1 packet, 6-bit Address field. |
| CID_DATA1 | 0F:[2:0] | 000 | CID Data Buffer 1. Contains 3-bit CID Data from the Data2/Data2bis packet to be shifted to the Caller ID Engine one bit at a time. See Section 0 for a full description of the CID Data buffering scheme. |
| CID_DATA2 | 0F:[6:4] | 000 | CID Data Buffer 2. Contains 3-bit CID Data from the Data2/Data2bis packet to be shifted to the Caller ID Engine one bit at a time. See Section 0 for a full description of the CID Data buffering scheme. |
| CID_RSS | 14:[5:4] | 00 | Caller ID Engine RingSizeSelector control bits, moved from BASIC P85 ring logic. |
| CIDEN | 0F:7 | 0 | Caller ID output enable. Control bit CIDEN enables the output of CID_DATA bits to the CID_INBIT input of the CID Engine in the BASIC device.<br>'1' = Caller ID Data shifted out to the CID_INBIT input of the BASIC device at 1-bit per 48 kHz clock.<br>'0' = Caller ID Data not shifted to the CID Engine. |
| CLKEN | 06:7 | 0 | Clock Enable. The CLKEN control bit controls the output drivers of the differential master clock/power source for the |

| | | | Line Side Device.<br>'1' = Differential clock drivers enabled.<br>'0' = Differential clock drivers disabled (pulled low). |
|---|---|---|---|
| CLKSHIGH | 06:[2:0] | 000 | Clocks High. Control bits CLOCKSHIGH control the duty cycle of the output clock/power.<br>'000' or '111' = 50% duty cycle.<br>'001'-'110' = 1 to 6 7ths high, 6 to 1 7ths low. This control can be used to control the total amount of power delivered to the LSD. |

| | | | |
|---|---|---|---|
| CNTLRDYA | 04:0 | 0 | Control Channel Ready Interrupt Active.<br>'1' = DIB Ping/Pong complete (either bit ERR or bit OK is a '1'). Control channel ready for next access.<br>'0' = DIB Ping/Pong incomplete. Control channel busy. |
| CNTLRDYM | 05:0 | 0 | Control Channel Ready Interrupt Mask.<br>'1' = Interrupt active.<br>'0' = Interrupt inactive (unable to generate host interrupt). |
| CONTROLIN | 01:[7-0] | 00h | DIB Control2 packet, 8-bit Control field. Contains 8-bit byte that was received from LSD register. |
| CONTROL OUT | 02:[7-0] | 00h | DIB Control1 packet, 8-bit Control field. Contains 8-bit byte to be read or written to or from LSD register. |
| CPMSRC[1:0] | 14:[1:0] | 00 | System Side Device Call Progress Monitor source select control.<br>'00' = CPM digital output inactive (clamp to high).<br>'01' = CPM digital output contains MSb from RXA word.<br>'10' = CPM digital output contains MSb from TXA word.<br>'11' = CPM digital output contains RXA MSb logically OR'd with TXA MSb. |
| DIBFAIL | 14:2 | 0 | DIB Failure Status Indicator. Indicates when one of the Error Counters has reached maximum value (for 4-bit counters, indicates when any of the 8 error counters reaches 'F'). May be used as an interrupt. See ERRFULLM and ERRFULLA.. |
| ERRCNTL1 | 08:[7:0] | 00h | Control1 packet error counter. Automatically incremented by SSD each time bit ERR of Control2 packet is a '1'. Reset to zero by any host write. |
| ERRCNTL2 | 0B:[7:0] | 00h | Control2 packet error counter. Automatically incremented (and SSD bit ERR(00:5] is set to '1') by SSD each Data2 packet has parity or non-legal symbol error. Reset to zero by any host write. |
| ERRD1 | 07:[7:0] | 00h | Data1 packet error counter. Automatically incremented by SSD each time bit ERR of Data2 packet is a '1'. Reset to zero by any host write. |
| ERRD1b | 09:[7:0] | 00h | Data1bis packet error counter. Automatically incremented by SSD each time bit ERR of Data2bis packet is a '1'. Reset to zero by any host write. |
| ERRD2 | 0A:[7:0] | 00h | Data2 packet error counter. Automatically incremented by SSD each Data2 packet has parity or non-legal symbol error. Reset to zero by any host write. |
| ERRD2b | 0C:[7:0] | 00h | Data2bis packet error counter. Automatically incremented by SSD each Data2bis packet has parity or non-legal symbol error. Reset to zero by any host write. |
| ERRFULLA | 04:2 | 0 | Error Counter Full Interrupt Active indicator.<br>'1' = One of the 8 error counters has reached the |

50

| | | | |
|---|---|---|---|
| | | | maximum allowed value ('F' for 4-bit counters). '0' = Error Counters are all below maximum value. |
| ERRFULLM | 05:2 | 0 | Error Counter Full Interrupt Mask. '1' = Interrupt active. '0' = Interrupt inactive (unable to generate host interrupt). |

| | | | |
|---|---|---|---|
| ERRRETRY | 0E:[7:0] | 00h | DIB Re-synchronization retry counter. Each time the SSD attempts to re-synchronize with the LSD, a failure of the LSD to reply to a SSD frame within 5 symbol clocks causes the SSD to auto-increment this counter and retry. Reset to zero by any host write. |
| ERRSYNC | 0D:[7:0] | 00h | DIB Synchronization error counter. Each time the LSD loses synchronization with the SSD and fails to transmit Data2, Control2, and Data2bis packets to the SSD, the SSD auto-increments this counter and begins trying to re-synchronize with the LSD. Reset to zero by any host write. |
| FINI | 00:5 | 0 | DIB Protocol status indicator.<br>'0' = Waiting for packets to received from LSD, or DIB in 'Listen Mode'.<br>'1' = Data2, Control2, (and opt. Data2bis) packets received from LSD and decoded. (May be used as interrupt source for host. The bit will be reset when the host writes a '0' to this bit.) |
| FREQ | 06:3 | 1 | Frequency. Control bit FREQ controls the output frequency of the differential clock outputs.<br>'1' = 4 MHz output frequency.<br>'0' = 140 kHz output frequency. (LSD 'asleep') |
| H/L | 03:0 | 0 | DIB Control1 packet, H/L control bit.<br>'1' = High – access upper half of 16-bit LSD register.<br>'0' = Low – access lower half of 16-bit LSD register. |
| INT | 00:7 | 0 | Copy of the MSb of the Control2 packet. Indicates the current interrupt status of the Line Side Device GPI. |
| INTE | 00:6 | 0 | Hardware Interrupt output enable for the SSD logic.<br>'0' = Interrupt output not driven.<br>'1' = Interrupt output driven. |
| LISTEN | 14:6 | 0 | System Side Device DIB state control. When the 4 MHz clock is active, if the LISTEN bit is:<br>'0' = DIB i/f is in Protocol Mode, sending and receiving frames over the DIB every 16 kHz sample time.<br>'1' = DIB interface is in Listen Mode, awaiting an interrupt (FSP) from the LSD. |
| LSDGPIOA | 04:1 | 0 | Line Side Device GPIO Interrupt Active indicator.<br>'1' = LSD GPIO interrupt is currently active.<br>'0' = No interrupt from LSD GPIO.<br>Note: Copy of bit INT(00:7). |
| LSDGPIOM | 05:1 | 0 | Line Side Device GPIO Interrupt Mask.<br>'1' = Interrupt active.<br>'0' = Interrupt inactive (unable to generate host interrupt). |
| OK | 00:4 | 0 | Status indicator for Control2 packet. This bit is reset when the host writes to the LSDADDR register.<br>'0' = Control2 packet received with error (if FINI = 1) or not yet received.<br>'1' = Control2 packet received without error. |

52

| | | | |
|---|---|---|---|
| PDM | 14:7 | 0 | Control bit to select Parallel Data Mode for data channel.<br>'0' = Serial Data Mode. Data to and from LSD is passed to and from SSD via a 20410-type SIF. Data words are echoed to SSD registers $10-$13, which are read only in this mode.<br>'1' = Parallel Data Mode. Data to and from LSD is passed to and from SSD via parallel bus, to registers $10-$13. Registers $10-$11 are R/W, and $12-$13 are read only. |
| PING/PONG | 0F:3 | 0 | CID Data PING/PONG buffer indicator. Indicates which of the two CID_DATAx buffers contains the most recent 3-bit input from the DIB.<br>'1' = CID_DATA1[2:0] contains the most recently read CID data. CID_DATA2 will be over-written when the next 3-bit data is received.<br>'0' = CID_DATA2[2:0] contains the most recently read CID data. CID_DATA1 will be over-written when the next 3-bit data is received.<br>PING/PONG is automatically toggled when the latest 3-bits are received from the DIB and placed into CID_DATAx. |
| PWROUT | 06:[6:4] | 000 | Power Output control. Controls the drive current of the differential clock output drivers. |
| RX | 00:2 | 0 | DIB Receive Status indicator bit.<br>'0' = DIB ping/pong protocol not in RX state.<br>'1' = DIB ping/pong protocol in RX state, receiving bits 64-117. |
| RXDATAH | 13:[7:0] | 00h | Receive Data High. Upper half of 16-bit received data word, from Data2/Data2bis packets. (Parallel data mode only). |
| RXDATAL | 12:[7:0] | 00h | Receive Data Low. Lower half of 16-bit received data word, from Data2/Data2bis packets. (Parallel data mode only). |
| TX | 00:1 | 0 | DIB Transmit Status indicator bit.<br>'0' = DIB ping/pong protocol not in TX state.<br>'1' = DIB ping/pong protocol in TX state, transmitting bits 0-61. |
| TXDATAH | 11:[7:0] | 00h | Transmit Data High. Upper half of 16-bit transmit data word, for use in Data1/Data1bis packets. (Parallel data mode only). |
| TXDATAL | 10:[7:0] | 00h | Transmit Data Low. Lower half of 16-bit transmit data word, for use in Data1/Data1bis packets. (Parallel data mode only). |
| W/R | 03:7 | 0 | DIB Control1 packet, W/R-bit.<br>'1' = Write.<br>'0' = Read. |
| WAIT | 00:0 | 0 | DIB Waiting for next ping/pong indicator bit.<br>'0' = DIB ping/pong protocol not waiting.<br>'1' = DIB ping/pong protocol waiting until next 16 kHz frame to begin to shift requested LSDCNTL. |

Caller ID Ping/Pong Buffer

Since 3 bits are transferred from the Line Side Device at a time, it will be useful to buffer 3-bit reads in case a new read is performed before all three bits are clocked out to the Caller ID Engine from the last 3-bit read. It is possible to implement a simple ping/pong buffer inside the CIDENGCTL register itself, as follows:

By default, the PING/PONG bit will be '0'. Setting the CIDEN bit to '1' (or any write to the CIDENGCTL register), will reset the PING/PONG bit (and the two 3-bit CID_DATAx fields) to '0'.

When CIDEN is a '1', *Data2/Data2bis* packet bits [10:8] will be copied to the CIDENGCTL register and shifted out at a 48 kHz clock rate to the CID_INBIT input of the CID Engine ASIC logic. Bit 10 is the oldest 1-bit CID comparator output sample.

When a new *Data2/Data2bis* packet is received, if PING/PONG is a '0', then:

(1) Bits [10:8] of the Data packet will be copied to bits [2:0] of CIDENGCTL (called CID_DATA1[2:0]), and (2) PING/PONG will be set to a '1' automatically.

(3) [SSD or host can now use CID_DATA1 bits].

Likewise, when a new *Data2/Data2bis* packet is received, if PING/PONG is a '1', then:

(1) Bits [10:8] of the Data packet will be copied to bits [6:4] of CIDENGCTL (called CID_DATA2[2:0]), and (2) PING/PONG will be reset to a '0' automatically.

(3) [SSD or host can now use CID_DATA1 bits].

When CIDEN is a '0', no output should be provided from the SSD logic to the CID Engine CID_INBIT. Bits 6 through 0 of CIDENGCTL are invalid for CID use.

Line Side Device Registers

The Line Side Device includes the registers shown below. Note that these are accessed via the LSDSTAT, LSDDATA, and LSDCNTRL registers indirectly over the DIB only, with one exception. When the DATAMODE bit of the LSD MCR register is a '1', the *Data2* and *Data2bis* packets contain the TRSTAT register contents instead of the sigma delta ADC RX word during each frame.

| Short Name | 6-bit Register # | \multicolumn{16}{c}{Bits} |
|---|---|---|---|---|---|---|---|---|---|---|---|---|---|---|---|---|---|
| | | D15 | D14 | D13 | D12 | D11 | D10 | D9 | D8 | D7 | D6 | D5 | D4 | D3 | D2 | D1 | D0 |
| NULL | 00 | x | x | x | x | x | x | x | x | x | x | x | x | x | x | x | x |
| EXMSC* | 01 | x | x | x | x | PRD | PRC | PRB | PRA | x | x | x | x | DAC1 | ADC1 | Mref | GPIO |
| M1R | 02 | x | x | x | x | x | x | x | x | \multicolumn{8}{c|}{SR[7:0]} |
| M1L | 03 | Mute DAC | x | x | x | DAC3 | DAC2 | DAC1 | DAC0 | Mute ADC | x | x | x | ADC3 | ADC2 | ADC1 | ADC0 |
| GPIOC | 04 | \multicolumn{16}{l|}{GC[15:0]} |
| GPIOP | 05 | \multicolumn{6}{l|}{GP[15:0]} | | | | | \multicolumn{6}{l|}{For IO[4:1] pins} |
| GPIOsti | 06 | \multicolumn{6}{l|}{GCS[15:0]} | | | | | \multicolumn{6}{l|}{For IO[4:1] pins} |
| GPIOW | 07 | \multicolumn{6}{l|}{GW[15:0]} | | | | | \multicolumn{6}{l|}{For IO[4:1] pins} |
| GPIOS | 08 | \multicolumn{6}{l|}{GI[15:0]} | | | | | \multicolumn{6}{l|}{For IO[4:1] pins} |
| GPIOD | 09 | \multicolumn{6}{l|}{GD[15:0]} | | | | | \multicolumn{6}{l|}{For IO[4:1] pins} |
| MCR* | 0A | TXM | –OH | DM1 | DATA MODE | RX GAIN | L1B2 | L1B1 | L1B0 | LM11 | LM10 | SCM1 | VM11 | VM10 | AM1 | EIC0 | x |
| MONADC | 0B | RDY | LCL | <MSb> | \multicolumn{4}{l|}{ADC[5:0]} | <LSb> | –RD/ CID | x | \multicolumn{2}{l|}{ADSEL[1:0]} | x | x | x | x |
| DCDAC | 0C | x | x | <MSb> | \multicolumn{4}{l|}{DAC[5:0] (write only)} | <LSb> | x | \multicolumn{3}{l|}{DASEL[2:0]} | WZ3 | WZ2 | WZ1 | USZ1 |

| TRSTAT | x | VCR[2:1] | VCR | x | CID_DATA[2:0] | x | -LPR[2:1] | -LPR | x | RDO/LPR[2:1] | RDO/LPR |
|---|---|---|---|---|---|---|---|---|---|---|---|
| 0D | | | | | | | | | | | |
| 0E | | | | | x | | | | | | |
| TEST* | 0F | | | | TEST[15:0] Reserved for Test | | | | | | |
| VEN1* | 10 | x | x | x | x | Bond1 | Bond0 | x | x | Rev[5:0] | | |

\* Registers which require 3 successive writes or reads without intermediate writes or reads from other registers to effect a change. This is to prevent these registers from being accidentally changed, which would power down the device or reset the registers.

Notes:

(1) CID_DATA[2] is the oldest of the three 1-bit Caller ID samples.

(2) For interrupt generation (wake-up) purposes, the LCL status bit, which indicates when the LSD experiences an unexpected loss of line current, is mapped to GPIO0. The RING comparator output (RDO/LPR) is mapped to GPIO1, the ~LPR comparator output is mapped to GPIO2, and the VCR output is mapped to GPIO3. Transitions on any of these bits should cause the Line Side Device (when asleep) to send an alerting signal to the System Side Device, causing the System Side Device to wake up the Line Side Device and handle the event (Caller ID, or Ring).

(3) Bits shown with no shading, and denoted by 'X', need not actually be implemented in the production device. They should have no effect when written to, and should return '0' when read. Bits shown in dark gray may be omitted from the first production device. The DIB protocol should be robust enough to support 16 GPIO bits as discussed in the PRS. However, the device requires only 4 GPIO. Similarly, the 2$^{nd}$ and 3$^{rd}$ bits for VCR, RDO/LPR, and ~LPR are for future use and do not need to be implemented in the first device.

(4) Register 0 is reserved as a null register, to be used for all Control packets where a valid register is not referenced.

(5) Registers 1 through 8 are defined in the 20424 Specification, and consist of all modem-specific registers inside the AMC97 codec. Register 9 is simply a GPIO Data Register, which contains the current GPIO values, and may be read/written to. Register A is a combination of AMC97 registers MISM and MCR1, and special control bits.

(6) Registers B through D consist of all specific control and status registers. These registers will be mapped to reserved registers 62h-66h in an AMC97 application by the SSD.

(7) Register F is reserved for test controls.

(8) Register 10 contains a 6-bit revision code to identify the LSD, as well as 2 bonding option status bits that will be defined later. Note that bonding options should be implemented such that the presence of a bonding wire enables the option, preventing unauthorized or surreptitious enabling of features by removing wires after packaging. Writing to this register resets all register bits to default values.

(9) ADSEL options will be decoded to 1 of 4 selections, based on the 2 ADSEL bits.

Line Side Circuitry

The Line Side device of this implementation contains the following list of functional blocks.

- $2^{nd}$ order Sigma-Delta Codec (modem ADC/DAC channel)
- Electronic Inductor
- World Wide impedance
- Ring Detector
- Caller ID Detector
- Hook Switch/Pulse Dialer
- Extension Off-Hook Detector
- GPIO
- 6-bit DAC
- 7-bit ADC The following sections will describe an embodiment of the Line Side device primarily from the DIB Interface. Therefore, these sections will describe the data protocol to be used on the DIB to send and receive data, control, and status information and list required control registers, describe each control function, list status registers, describe each status function, and list and describe Codec registers.

DIB Protocol – Line Side

Requirements

The DIB protocol passes all required register data over the Digital Isolation Barrier, including, at minimum, one Transmit and one Receive Data Word per 16 kHz sample time, and optional control/status words. A means of re-transmitting packets received in error may be implemented since no error correction exists at the receiver.

This DIB Protocol discussion concentrates on a description of Line Side device behavior. For a complementary discussion of System Side behavior, see the System Side Device Digital Functional Specification.

Proposed Implementation

Assumptions

The Line Side implementation of the DIB protocol assumes the following:

- The Line-Side Device (LSD) is a slave device to the System Side Device (SSD). The LSD does not initiate a transfer across the DIB unless it is requested, except when asleep.

Note: This implies that any semi-continuous monitoring of Line Side status by the System Side requires the System Side to poll the LSD.

- The Line Side Device will only communicate over the DIB to the System Side Device using the DIB packet protocol when both are awake (i.e., 4 MHz clock is running), and the Line Side has been synchronized to the System Side.

- The Line Side Device will go to 'listen' mode and await GPIO activity or SSD resynchronization when no FSP frame is received from the SSD.

- The System Side Device should write to the power control register (EXMSC, Register 000001) to power down portions of the Line Side Device prior to reducing the clock frequency. In sleep mode, GPIO states may be maintained and the Caller ID and Ring detectors may function.

- When asleep, the Line Side Device will generate a wake-up signal across the DIB to the System Side Device if any activity is detected by the Ring detector, Caller ID detector, or GPI.

Note: Obviously non-legal states (such as going off-hook without being commanded to do so or while asleep) should cause the Line Side device to generate a wake-up signal across the DIB to the System Side Device.

- Once synchronization is established across the DIB, both sides can count clock cycles (of he 4 MHz input clock, or the 2 MHz clock derived from it).

- It takes less than one (2) 2 MHz clock cycles for the DIB transceivers to switch from one direction to another. Two information bit times are allocated every time the direction of communication is changed.

- The Line Side device is not responsible for analysis of the RING signal, including Pulse Dial rejection, Extension off-hook rejection, RING_WAKE generation, or RING verification. The System Side Device is responsible for these functions.

Bandwidth Summary
See section 2.2.2.

DIB Ping-Pong Protocol Summary
See section 2.2.3

Frame Synchronization Pattern Definition
See section 2.2.4

Reversal Synchronization Pattern Definition
See section 2.2.5

Packet Definitions

The following sections show the format for each of the packets received by or sent by the Line Side device. The packets are shifted over the DIB from left to right as shown in the tables below, ending with the parity bit.

For simplicity, all packets consist of 18 bits and end with a single parity bit.

Packets Received by the Line Side Device

Data1 Packet Definition

| Data | | | --- | PAR |
|---|---|---|---|---|
| <MSb> | 16 bits | <LSb> | 1 bit | 1 bit |

- DATA: 16-bit sample, with the most significant bit shifted first.

- PARITY (PAR): Parity bit, used for error detection. Odd parity will be calculated using the first 18 bits of the packet.

Control1 Packet Definition

| W/R | Address | H/L | Control | --- | PAR |
|---|---|---|---|---|---|
| 1 bit | 6 bits | 1 bit | 8 bits | 1 bit | 1 bit |

- WRITE/READ (W/R): In a control packet sent by the system side, this bit indicates whether this is a write or a read request. W/R is set to '1' for a write request, to '0' otherwise.

Note that for a read request, the system side device sends a packet with null control bits, used to pad the control packet to the full 18 bits.

- ADDRESS: This field contains the address of the control/status register being transmitted.

- HIGH/LOW (H/L): Control bit used to indicate whether the SSD is addressing the upper (high) or lower (low) byte of the 16-bit LSD register. This bit is set to '1' if the high byte is being addressed, to '0' otherwise.

Note: The Line Side Device DIB interface implements logical 8-bit addressing using the Address (6-bit) and H/L bit. The high or low byte is transmitted independently of the other byte (i.e., it is not necessary for the host to follow the high byte with the low byte or vice versa).

- CONTROL: This field contains the control/status byte.

- PARITY (PAR): This bit is a parity bit, used for error detection. Odd parity will be calculated using the first 17 bits of the packet.

Data1bis Packet Definition

The contents of the *Data1bis* packet are identical to those of the *Data1* packet.

Packets Transmitted by the Line Side Device

Data2 Packet Definition

| Data | | | ERR | PAR |
|---|---|---|---|---|
| <MSb> | 16 bits | <LSb> | 1 bit | 1 bit |

- ERROR (ERR): The Line Side device sets this bit if an error was detected in the received *Data1* packet from the System Side device.

A counter should be implemented on the System Side device to track how many times the Line Side indicates an error in transmitted data packets. The host should be able to reset the counter on demand.

- DATA: 16-bit sample, with the most significant bit shifted first. When control bit DATAMODE in the Line Side Device register MCR is a 1, the Data will consist of the sampled output of the Caller ID comparator and the RING comparators, in the following format. For Caller ID and RING, the 3 bits represent 3 1-bit comparator outputs sampled at 48 kHz. The most significant bit of each field is the 'oldest' bit. Caller ID data and RING data are also available via polling Register C1.

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| 0 | VCR[2:0] | | | 0 | CID_DATA[2:0] | | | 0 | ~LPR[2:0] | | | 0 | RDO/LPR[2:0] | | |

- PARITY (PAR): This bit is a parity bit, used for error detection. Odd parity will be calculated using the first 17 bits of the packet.

Control2 Packet Definition

| INT | Address | H/L | Control | ERR | PAR |
|---|---|---|---|---|---|
| 1 bit | 6 bits | 1 bit | 8 bits | 1 bit | 1 bit |

- INTERRUPT (INT): The Line Side device sets this bit when an "interrupt" event occurs in the Line Side device register set.

Note that only GPIO registers can generate interrupts. GPIO interrupts can be level ('0' or '1') or edge (rising or falling) generated, as defined in the AMC97 GPIO register control set definition. See the 20424 Specification for more details. The output of the RDO/LPR and ~LPR comparators should be connected to GPIO on the Line Side Device and programmed by the SSD to generate interrupts based on any ring activity. After an Interrupt is signaled in the Control2 packet, the System Side Device will most likely read the GPIO Status register in the following frame to identify the Interrupt source.

- ADDRESS: This field contains the address of the control/status register being transmitted. In the case of a write, the address written to is echoed back to the System Side Device.

- HIGH/LOW (H/L): Control bit used to indicate whether the LSD is returning the upper (high) or lower (low) byte of a 16-bit LSD register. This bit is set to '1' if the high byte is being addressed, to '0' otherwise.

Note: The Line Side Device DIB interface implements logical 8-bit addressing using the Address (6-bit) and H/L bit. The high or low byte is transmitted independently of the other byte (i.e., it is not necessary for the host to follow the high byte with the low byte or vice versa).

- CONTROL: This field contains the control/status byte. In the case of a response to a write, the control byte written to the Line Side Device is echoed back to the System Side Device.

- ERROR (ERR): The Line Side device sets this bit if an error was detected in the received *Control1* packet from the System Side device.

A counter should be implemented on the System Side device to track how many times the line side indicates an error in transmitted control packet. Note that an erroneously received control packet will be discarded by the Line Side and should be retransmitted at the next frame. The host should be able to reset the counter on demand.

- PARITY (PAR): This bit is a parity bit, used for error detection. Odd parity will be calculated using the first 17 bits of the packet.

Data2bis Packet Definition

The contents of the *Data2bis* packet are identical to those of the *Data2* packet. The only difference is that the ERR bit is only set if the LSD detected an error in the *Data1bis* packet received.

DIB Synchronization – Line Side

Synchronization will be achieved/maintained between the SSD (master) and LSD (slave) by means of a special sequence of symbols (the FSP) sent to the Line Side device at the beginning of each frame or whenever synchronization is lost. When sufficient power is present (i.e., the power clock is being received), the LSD will always respond to a frame beginning with the FSP. When power is present, but the LSD is 'asleep', GPIO activity will cause the LSD to send FSP to the SSD, to request wake-up. A state-diagram is included in Figure 2 below:

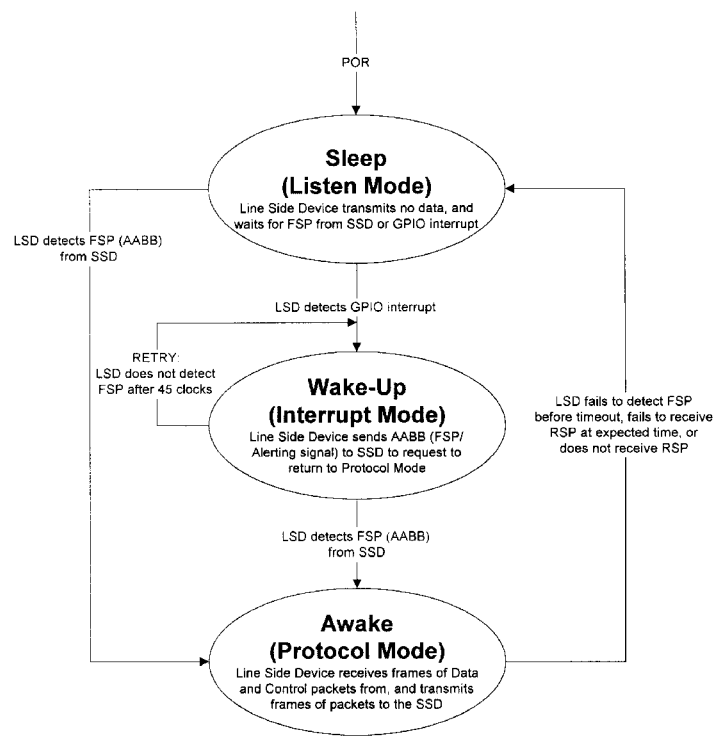

• Figure 2. Line Side Device DIB States

DIB Power On Reset

When the system is powered up, the Line Side DIB interface defaults to Listen Mode, in which it is a receiver, awaiting a frame of data and control information from the SSD. The System Side device initiates normal operation (Protocol Mode) by sending a frame of data and control information to the LSD. Each time it completes transmission of the frame, the system side reverses the DIB and "listens" for the return packets from the LSD. If it does not receive anything within the following 5 bit times, it reverses the DIB again and re-transmits the frame.

The periodic re-transmission of the frame continues until the Line Side successfully receives the full frame. When the LSD detects the end of a full frame, the LSD configures its DIB interface as an output and begins transmitting the return packets within 5 bit times of the end of the SSD RSP. After the SSD successfully receives the return packets from the LSD, normal communication between the two devices has been established, and the SSD will send periodic frames to the LSD.

Cold Reset

The System Side Device may at any time perform a cold reset of the LSD by stopping the power clock altogether for a predetermined number milliseconds, allowing the VCC voltage of the LSD to dissipate. The System Side may then re-start the Line Side Device by turning on the clock and performing the synchronization described above. This reset mechanism is slow and should be used only as a last resort. Alternatively, the System Side Device may write to the ID register (VEN1, Register 16) to reset all register bits to default status.

Line Side Wake-Up Summary

If the Line Side is 'asleep' (i.e., the device is in Listen Mode and the power clock is 140 kHz) and activity is detected from any GPIO configured to generate an interrupt, the Line Side will generate an alerting signal to the System Side Device. Immediately after alerting the SSD, the LSD will switch its interface to receive mode.

The alerting signal will consist of 4 symbols, 'AABB', at the 70 kHz bit rate (1/2 the power clock). This will correspond to data bits of '11110000'. Note that 'A' and 'B' have been chosen as noise tolerant special signals because they generate a transmit signal which is a sub harmonic of the 140 kHz power clock and the 70 kHz bit clock and will therefore be unlikely to be generated by board or clock noise.

Upon detection of the activity on the DIB data lines, and verification of the 'AABB' signal, the System Side device will raise the power clock frequency to 4 MHz, and begin transmitting a frame beginning with FSP, as described in Section 0.

Wake-Up Time Budget

Caller ID response time appears to place the most stringent requirements on device wake-up, especially in the D3Cold case (host CPU is asleep, power is limited to the PCI slot). The Caller ID requirements generally specify a worst case time of 100 milliseconds between the alerting signal (a Line Polarity Reversal in the worst case) and the beginning of the Caller ID data. Thus, it is required that the maximum wake-up and resynchronization time for the Line Side device and DIB interface be well within the 100-millisecond limitation.

The 'AABB' System Side Device alerting signal takes approximately 60 microseconds for the Line Side to transmit. It is estimated that the output power clock on the SSD will take less than 100 microseconds to slew between the 140 kHz sleep clock and the 4 MHz normal operation clock. Power is already present at the Line Side Device when the 140 kHz clock is present, so no additional time is required for the Line Side power supply to ramp up. Thus, it appears that ample time is available to wake up and start receiving RING or CID_DATA for the Caller ID engine in the SSD.

Line Side Error Detection

The Line Side can detect several types of error in the received data, described below. In some cases, the Line Side response to an error is to stop communicating with the System Side device. This indicates that the System Side device should re-awaken the Line Side device with a frame beginning with FSP.

Non-Legal Data Symbols

If the Line Side receives an 'A' or 'B' signal at any time after the reception of the FSP, one of two types of errors has occurred. Either one half of one symbol ('0' = '01' or '1' = '10') has been corrupted, resulting in a half-symbol error, or there has been a loss of synchronization due to a clock slip on the system side device.

The Line Side device will determine which error has occurred if the RSP is received as scheduled in the protocol. If the RSP is received late or not at all, then the LSD will respond to the error by going to Listen Mode until the SSD sends another frame beginning with FSP.

If the RSP is received on time, the Line Side device detects a Non-Legal Data Symbol error, and communication over the DIB continues without a resynchronization. The Line Side device reacts by using the other data packet or discarding the control packet, as appropriate, and sets the appropriate ERR bit in its frame response.

Parity Error

If, at the end of the *Data1*, *Control1*, or *Data1bis* packets, the Parity bit for the first 17 bits in the packet does not agree with the LSD calculated parity of the data in the packet, then a Parity Error is detected. A Parity error in this case indicates that an odd number of symbols have changed from '0' to '1' or vice versa.

If the Parity bit of any packet is received as an 'A' or 'B' symbol, it is corrupted and the Line Side detects a Non-Legal Data Symbol error.

The Line Side Device reacts by using the other data packet or discarding the control packet, as appropriate, and sets the appropriate ERR bit in its frame response.

Time Out

If the Line Side device does not receive the RSP as symbols 58-61 (or alternatively 40-43) in a given frame, a loss of synchronization has occurred between the two devices. In this case, the Line Side device will enter Listen Mode until the System Side sends another frame beginning with FSP.

During the Wake Up sequence described in Section 0, it is possible for the System Side device to miss the Line Side alerting signal, 'AABB'. In this case, the Line Side Device should wait a number of clock cycles, and re-transmit the alerting signal. It is important that the LSD and SSD do not wait the same number of clock cycles (4 cycles of the 2 MHz bit clock) before re-transmission, to prevent repeated collisions on the DIB of the SSD FSP and the LSD Alerting signal (FSP), and subsequent failure to wake up.

The Line Side device should still receive the 140 kHz 'sleep' clock. Therefore, each 'clock' on the Line Side corresponds to 29 clocks on the System Side (which still has the 4 MHz source). It will take less than 100 microseconds to raise the clock, and each 70 kHz clock is about 14 microseconds. Therefore, it will take a minimum of 7 clocks before the SSD frame can be sent and recognized by the LSD.

The Line Side Device should wait 45 clocks before resending the alerting signal if the SSD has not yet begun sending the FSP.

Error Condition Pseudo-Code
The following pieces of pseudo-code show how the Line Side implementation of the DIB protocol handles various error conditions.

If (line side detects error in *Data1*) then
    Line side disregards data sample received in *Data1*;
    Line side uses data sample in *Data1bis* instead;
    Line side sets ERR in *Data2*;
Endif If (line side detects error in *Data1bis*) then
    Line side sets ERR in *Data2bis*;
Endif If (line side detects error in *Control1*) then
    Line side sends null control packet in *Control2*;
    Line side sets ERR in *Control2*;
    System side resends control packet in *Control1* of the following frame;
Endif If (line side loses synchronization (loss of clock, no FSP, etc...))
    Line side stops transmission;
    System side detects loss of contact;
    System side re-transmits frame;
    Line side detects FSP;
    Communication resumes;
Endif

Line Side Device Register Set (Proposed)

Requirements
The proposed Register Set will allow extra, unused, control and status bits for foreseeable Line Side control and status functions that are not implemented in the first design.

Proposed Implementation

The following proposed implementation provides the control and status functionality known to be required as of this writing. In addition, the registers are structured so as to require minimal re-mapping when used in related products.

| Short Name | 6-bit Register # | Bits | | | | | | | | | | | | | | | |
|---|---|---|---|---|---|---|---|---|---|---|---|---|---|---|---|---|---|
| | | D15 | D14 | D13 | D12 | D11 | D10 | D9 | D8 | D7 | D6 | D5 | D4 | D3 | D2 | D1 | D0 |
| NULL | 00 | x | x | x | x | x | x | x | x | x | x | x | x | x | x | x | x |
| EXMSC* | 01 | x | x | x | x | PRD | PRC | PRB | PRA | x | x | x | x | DAC1 | ADC1 | Mref | GPIO |
| M1R | 02 | x | x | x | x | x | x | x | x | | | | SR[7:0] | | | | |
| M1L | 03 | Mute DAC | x | x | x | DAC3 | DAC2 | DAC1 | DAC0 | Mute ADC | x | x | x | ADC3 | ADC2 | ADC1 | ADC0 |
| GPIOC | 04 | | | | GC[15:0] | | | | | | For IO[4:1] pins | | | | | | |
| GPIOP | 05 | | | | GP[15:0] | | | | | | For IO[4:1] pins | | | | | | |
| GPIOsti | 06 | | | | GCS[15:0] | | | | | | For IO[4:1] pins | | | | | | |
| GPIOW | 07 | | | | GW[15:0] | | | | | | For IO[4:1] pins | | | | | | |
| GPIOS | 08 | | | | GI[15:0] | | | | | | For IO[4:1] pins | | | | | | |
| GPIOD | 09 | | | | GD[15:0] | | | | | | | | | | | | |
| MCR* | 0A | TXM | ~OH | DM1 | DATA MODE | RX GAIN | L1B2 | L1B1 | L1B0 | LM11 | LM10 | SCM1 | VM11 | VM10 | AM1 | x | x |

| Register | Addr | | | | | | | | | | | | | | | | |
|---|---|---|---|---|---|---|---|---|---|---|---|---|---|---|---|---|---|
| | | RDY | <MSb> | | | ADC[6:0] | | | | <LSb> | −RD/CID | x | ADSEL[1:0] | | x | x | x |
| MONADC | 0B | RDY | <MSb> | ADC[6:0] | | | | | | <LSb> | −RD/CID | x | ADSEL[1:0] | | x | x | x |
| DCDAC | 0C | USZ1 | USZ0 | DAC[5:0] (write only) | | | | | | | EIC0 | x | DASEL[2:0] | | | WZ2 | WZ1 | WZ0 |
| TRSTAT | 0D | x | VCR[2:0] | | | CID_DATA[2:0] | | | x | x | x | x | −LPR[2:1] | | −LPR | RDO/LPR[2:1] | | RDO/LPR |
| — | 0E | | | | | | | | x | | | | | | | | |
| TEST1 | 0F | | | | | TEST1[15:0] Reserved for Test | | | | | | | | | | | |
| TEST2 | 10 | | | | | TEST2[15:0] Reserved for Test | | | | | | | | | | | |
| VEN1* | 11 | x | x | x | x | x | x | x | Bond1 | Bond0 | x | x | x | Rev[5:0] | | | | |

\* Registers which require 3 successive writes or reads without intermediate writes or reads from other registers to effect a change. This is to prevent these registers from being accidentally changed, which would power down the device or reset the registers.

Notes:

(1) CID_DATA[2] is the oldest of the three 1-bit Caller ID samples.

(2) For interrupt generation (wake-up) purposes, the LCL status bit, which indicates when the LSD experiences an unexpected loss of line current, is mapped to GPIO0. The RING comparator output (RDO/LPR) is mapped to GPIO1, the ~LPR comparator output is mapped to GPIO2, and the VCR output is mapped to GPIO3. Transitions on any of these bits should cause the Line Side Device (when asleep) to send an alerting signal to the System Side Device, causing the System Side Device to wake up the Line Side Device and handle the event (Caller ID, or Ring).

(3) Bits shown with no shading, and denoted by 'X', need not actually be implemented in the production device. They should have no effect when written to, and should return '0' when read. Bits shown in dark gray may be omitted from the first production device. The DIB protocol should be robust enough to support 16 GPIO bits as discussed in the PRS. However, the device requires only 4 GPIO. Similarly, the $2^{nd}$ and $3^{rd}$ bits for VCR, RDO/LPR, and ~LPR are for future use and do not need to be implemented in the initial device.

(4) Register 0 is reserved as a null register, to be used for all Control packets where a valid register is not referenced.

(5) Registers 1 through 8 consist of all modem-specific registers inside the codec. Register 9 is simply a GPIO Data Register, which contains the current GPIO values, and may be read/written to. Register A is a combination of registers MISM and MCR1 from another design, and special control bits.

(6) Registers B through D consist of all design specific control and status registers.

(7) Register F is reserved.

(8) Register 10 contains a 6-bit revision code to identify the LSD, as well as 2 bonding option status bits that will be defined later. Note that bonding options should be implemented such that the presence of a bonding wire enables the option, preventing unauthorized or surreptitious enabling of features by removing wires after packaging. Writing to this register resets all register bits to default values.

(9) ADSEL options will be decoded to 1 of 4 selections, based on the 2 ADSEL bits.

Line Side Device Register Bit Definitions

| Name | Reg | Def. | Description |
|---|---|---|---|
| ADC[3:0] | 03:[3:0] | 0 | Controls signal gain to ADC in 4 steps: 0, +10, +15, +22.5 dB. |
| ADC[6:0] | 0B:[14:8] | X | 7-bit monitor ADC used for Line Voltage (on and off hook) and Vdd measurement. |
| ADC1 | 01:2 | X | 16-bit Sigma Delta ADC circuit ready indicator at cold start/reset.<br>'1' = ADC ready.<br>'0' = ADC not ready. |
| ADSEL[1:0] | 0B:[5:4] | 00 | 7-bit monitor ADC input select.<br>'00' = On-hook Line Voltage.<br>'01' = Off-hook line voltage.<br>'10' = Vdd measurement<br>'11' = Undefined. |
| AM1 | 0A:2 | 0 | Modem Line ADC LPF dB gain.<br>'0 = 0 dB<br>'1' = -4 dB. |
| Bond[1:0] | 11:[7:6] | 11 | Bond options<br>'0' = enable bond-able feature (add wire to GND) |
| CID_DATA[2:0] | 0D:[10:8] | X | Output of Caller ID comparator circuit. Most recent three bits, sampled at 48 kHz. (Bit 2 is oldest). |
| DAC[3:0] | 03:[11:8] | 0 | Controls signal gain to DAC in 4 steps: 0, -10, -15, -22.5 dB. |
| DAC[5:0] | 0C:[13:8] | 00h | 6-bit DC Control DAC output. Used for DC current control and Ring Threshold. |
| DAC1 | 01:3 | X | 16-bit Sigma Delta DAC circuit ready indicator at cold start/reset.<br>'1' = DAC ready.<br>'0' = DAC not ready. |
| DASEL[1:0] | 0C:[6:4] | 000 | 6-bit DC control DAC output select.<br>'000' – '111' = Undefined. |
| DATAMODE | 0A:12 | 0 | Tip & Ring monitor mode enable. Controls Data2 packet content for DIB.<br>'1' = Copy TRSTAT to Data2/Data2bis packets<br>'0' = Use RX word from 16-bit ADC for Data2/Data2bis. |
| DM1 | 0A:13 | 1 | Dither enable for modem ADC.<br>'1' = Dither circuit enabled.<br>'0' = Dither circuit disabled. |
| EIC0 | 0C:7 | 1 | Control time constant for Electronic Inductor for Tip & Ring.<br>'1' = Undefined.<br>'0' = Undefined. |
| GC | 4:[15:0] | FFh | GPIO Pin Direction configuration mask register.<br>'1' = GPIOx is an input.<br>'0' = GPIOx is an output. |

| | | | |
|---|---|---|---|
| GCS | 6:[15:0] | 00h | GPIO Pin Sticky configuration mask register.<br>'1' = GPIx is non-sticky (level sensitive)<br>'0' = GPIx is sticky (edge sensitive). |
| GI | 08:[15:0] | XXh | GPIO Pin Status register.<br>'1' = GPIx (level sensitive) is active, or GPIx (edge sensitive) has detected an edge, or<br>GPOx output is high.<br>'0' = GPIx is inactive (no edge) or output low. |
| GP | 05:[15:0] | FFh | GPIO Pin Polarity/Type configuration mask register.<br>'0'= Low active/CMOS output<br>'1' = high active/open-drain output. |
| GPIO | 1:0 | X | GPIO circuit ready indicator at cold start/reset.<br>'1' = GPIO ready.<br>'0' = GPIO not ready. |
| GW | 07:[15:0] | 00h | GPIO Pin Wake up configuration mask register.<br>'0' = No interrupt on GPIO activity<br>'1' = Interrupt on GPIO activity. |
| L1B[2:0] | 0A:[10:8] | 000 | Modem Line Loop Back Control.<br>'000' = Normal operation<br>'001' = ADC loop back<br>'010' = Local Analog loop back<br>'011' = DAC loop back<br>'100' = Remote Analog loop back<br>'101' = ADC and DAC loop back combined<br>'110' = DAC one bit out<br>'111' = SCF one bit in. |
| LCL | 0B:14 | X | Line Current Loss indicator.<br>'0' = Normal<br>'1' = Line Current is zero even though EI is trying to draw current from Telco. |
| LM1[1:0] | 0A:[7:6] | 00 | Modem Line TX low pass filter pole location.<br>'00' = 8 kHz<br>'01' = 12 kHz<br>'10' = 25 kHz<br>'11' = 25 kHz. |
| ~LPR | 0D:4 | X | Output of LPR Detector (comparator). Either RDO/LPR or ~LPR will be 1 when Line Polarity Reversal is received. |
| Mref | 1:1 | X | Modem Reference Voltage circuit ready indicator at cold start/reset.<br>'1' = Mref ready.<br>'0' = Mref not ready. |
| Mute ADC | 3:7 | 1 | Mutes Sigma-Delta ADC input.<br>'1' = Mute enabled.<br>'0' = Mute disabled. |

| | | | |
|---|---|---|---|
| Mute DAC | 3:15 | 1 | Mutes Sigma-Delta DAC output.<br>'1' = Mute enabled.<br>'0' = Mute disabled. |
| ~OH | 0A:14 | 1 | Off Hook Control bit.<br>'1' = On hook<br>'0' = Off hook (drawing line current). |
| PRA | 1:8 | 1 | Power control for GPIO |
| PRB | 1:9 | 1 | Power control for Modem Voltage Reference |
| PRC | 1:10 | 1 | Power control for Sigma-Delta ADC |
| PRD | 1:11 | 1 | Power control for Sigma-Delta DAC |
| ~RD/CID | 0B:7 | 0 | Ring Detect/CID Detect Select bit.<br>'0' = Ring Detector active<br>'1' = CID detector active. |
| RDO/LPR | 0D:0 | X | Output of Ring Detect Comparator/LPR Detector. |
| RDY | 0B:15 | X | Ready Status bit.<br>'1' = 7-bit monitor ADC value ready.<br>'0' = 7-bit ADC not ready. |
| Rev[5:0] | 11:[5:0] | 00 | Revision code for Line Side Device. First device will use 000000. |
| RXGAIN | 0A:11 | 1 | 6 dB Digital Gain control for ADC output.<br>'1' = +6 dB to ADC word.<br>'0' = 0 dB applied to ADC word. |
| SCM1 | 0A:5 | 0 | Modem Line TX SCF gain control.<br>'0' = 0 dB gain<br>'1' = 6 dB gain. |
| SR | 2:[7:0] | 2Fh | Oversampling Ratio (OSR) for Sigma-Delta codec.<br><br>'2F' = 16 kHz sampling rate. |
| TEST1 | 0F:[15:0] | XX | TEST register – reserved for tests. |
| TEST2 | 10:[15:0] | XX | TEST register – reserved for tests. |
| TXM | 0A:15 | 0 | Transmit path enable.<br>'1' = Modem transmit path enabled.<br>'0' = Modem transmit path disabled. |
| USZ[1:0] | 0C:[15:14] | 11 | US Virtual Impedance Enable/Disable<br>'11' = US VI Enabled.<br>'00' = US VI Disabled. |

| VCR | 0D:12 | X | Output of Voltage Clamp circuit.<br>'1' = Circuit is actively clamping Vdd. |
|---|---|---|---|
| VM1[1:0] | 0A:[4:3] | 00 | Modem Line DAC interpolator gain.<br>'00' = 0 dB<br>'01' = 6 dB gain<br>'10' = 12 dB gain<br>'11' = -6 dB gain. |
| WZ[2:0] | 0C:[2:0] | 000 | World Wide Virtual Impedance Enable/Disable<br>'11' = WW VI Enabled.<br>'00' = WW VI Disabled. |

We claim:

1. A data access arrangement having a line side and a system side for separation by a voltage isolation barrier, comprising:
   line side circuitry, comprising:
      a first isolation barrier interface for bidirectional communications with the voltage isolation barrier;
      a network interface configured to communicatively couple the line side circuitry to a network, the network interface including at least one programmable feature; and
      a coder/decoder coupled to the first isolation barrier interface and the network interface; and
   system side circuitry, comprising:
      a second isolation barrier interface for bidirectional communication with the voltage isolation barrier, the second isolation barrier interface configured to provide signals to and receive signals from the first isolation barrier interface via the voltage isolation barrier; and
      a system interface communicatively coupled to the second isolation barrier interface, the system interface configured to provide signals to and receive signals from host system circuitry.

2. The data access arrangement of claim 1, wherein the signals provided to the first isolation barrier interface by the second isolation barrier interface further include signals for programming predetermined characteristics of the coder/decoder.

3. The data access arrangement of claim 1, wherein the system side circuitry further comprises a call progress monitor coupled to the second isolation barrier interface, the call progress monitor configured to analyze the encoded information generated by the coder/decoder for purposes of providing an audible signal relating to the encoded information.

4. The data access arrangement of claim 1, wherein the network interface comprises programmable detection circuitry for detecting predetermined conditions on a network.

5. The data access arrangement of claim 4, wherein signals provided to the first isolation barrier interface by the second isolation barrier interface include signals for programming a predetermined threshold of the detection circuitry.

6. The data access arrangement of claim 5, wherein the detection circuitry comprises ring detection circuitry, and wherein the predetermined threshold is a ring detect threshold level.

7. The data access arrangement of claim 4, wherein the detection circuitry comprises line polarity reversal detection circuitry.

8. The data access arrangement of claim 4, wherein the detection circuitry comprises remote on-hook detection circuitry.

9. The data access arrangement of claim 4, wherein the detection circuitry comprises extension off-hook detection circuitry.

10. The data access arrangement of claim 1, wherein the network interface comprises programmable measurement circuitry for measuring an electrical characteristic(s) of a network.

11. The data access arrangement of claim 10, wherein signals provided to the first isolation barrier interface by the second isolation barrier interface include signals for programming a predetermined threshold of the measurement circuitry.

12. The data access arrangement of claim 10, wherein the measurement circuitry comprises ring detection circuitry.

13. The data access arrangement of claim 10, wherein the measurement circuitry comprises loop current measurement circuitry.

14. The data access arrangement of claim 1, wherein the network interface comprises programmable line impedance circuitry for altering the electrical characteristics of the data access arrangement as perceived by the network, the programmable line impedance circuitry responsive to configuration control signals provided by the system side circuitry via the voltage isolation barrier.

15. The data access arrangement of claim 1, wherein the network interface comprises a programmable line driver for driving information decoded by the codec/decoder onto a network, the programmable line driver providing signals of a predetermined strength in response to control signals provided by the system side circuitry via the voltage isolation barrier.

16. The data access arrangement of claim 1, including at least one power state in which the line side circuitry is powered by the system side via the voltage isolation barrier.

17. A computer system, comprising:
   a data bus;
   a processor coupled to the data bus; and
   a modem, the modem comprising:
      a voltage isolation barrier having a first side and a second side;
      system side circuitry coupled between the data bus and the first side of the voltage isolation barrier;
      a coder/decoder coupled to the second side of the voltage isolation barrier, the coder/decoder having at least one programmable feature,
      the system side circuitry configured to provide information from the data bus to the coder/decoder via the voltage isolation barrier.

18. The computer system of claim 17, further comprising programmable detection circuitry coupled to the second side of the voltage isolation barrier for detecting predetermined events on a network, the system side circuitry further configured to provide signals for programming a predetermined threshold of the detection circuitry.

19. The computer system of claim 18, further comprising programmable measurement circuitry coupled to the second side of the voltage isolation barrier for measuring electrical characteristics of a telephone network, the system side circuitry further configured to provide signals for programming a predetermined threshold of the measurement circuitry.

20. A method for encoding information in a data access arrangement having a line side for coupling to a telephone network and a system side for coupling to host system circuitry, the line side and the system side separated by a voltage isolation barrier, comprising the steps of:
   providing a coder/decoder on the line side, the coder/decoder having at least one programmable feature;
   utilizing the coder/decoder to encode information from the telephone network;
   transferring the encoded information to the system side, via the voltage isolation barrier, for provision to the host system circuitry.

* * * * *